United States Patent
Ohta et al.

(10) Patent No.: US 9,199,607 B2
(45) Date of Patent: Dec. 1, 2015

(54) IN-VEHICLE APPARATUS

(75) Inventors: Mitsuru Ohta, Kobe (JP); Yoshihiro Sasaki, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 190 days.

(21) Appl. No.: 13/302,487

(22) Filed: Nov. 22, 2011

(65) Prior Publication Data

US 2012/0140073 A1    Jun. 7, 2012

(30) Foreign Application Priority Data

Dec. 6, 2010   (JP) .................................. 2010-272018

(51) Int. Cl.
*H04N 7/18*     (2006.01)
*B60R 25/10*    (2013.01)
*B60R 1/00*     (2006.01)

(52) U.S. Cl.
CPC ............... *B60R 25/1012* (2013.01); *B60R 1/00* (2013.01); *B60R 2300/50* (2013.01); *B60R 2300/607* (2013.01)

(58) Field of Classification Search
USPC ......................................................... 348/148
See application file for complete search history.

(56) References Cited

U.S. PATENT DOCUMENTS

| | | | | |
|---|---|---|---|---|
| 7,286,825 B2* | 10/2007 | Shishido et al. | ........... | 455/435.1 |
| 2002/0175999 A1* | 11/2002 | Mutobe et al. | ................ | 348/148 |
| 2007/0003108 A1* | 1/2007 | Chinomi et al. | .............. | 382/104 |
| 2007/0285282 A1* | 12/2007 | Nakayama et al. | ........... | 340/937 |
| 2007/0297692 A1* | 12/2007 | Hamatani | ........... | G06T 382/282 |
| | | | | 382/282 |
| 2008/0091657 A1* | 4/2008 | Yamazaki | ............. | G01C 21/32 |
| | | | | 1/1 |
| 2008/0119994 A1* | 5/2008 | Kameyama | ..................... | 701/48 |
| 2008/0249707 A1* | 10/2008 | Shiragami | .......... | G01C 21/3476 |
| | | | | 701/426 |
| 2009/0179912 A1* | 7/2009 | Hashizume | .......... | G01C 21/367 |
| | | | | 345/611 |
| 2009/0299627 A1* | 12/2009 | Hasegawa | ..................... | 701/211 |
| 2010/0201817 A1* | 8/2010 | Katoh | ....................... | B60R 1/00 |
| | | | | 348/148 |
| 2010/0217524 A1* | 8/2010 | Oohashi | .................. | G01S 19/49 |
| | | | | 701/472 |
| 2011/0032374 A1* | 2/2011 | Imanishi et al. | ........... | 348/222.1 |
| 2012/0105635 A1* | 5/2012 | Erhardt et al. | ................ | 348/148 |

FOREIGN PATENT DOCUMENTS

| | | |
|---|---|---|
| JP | A-2002-330428 | 11/2002 |
| JP | A-2003-182454 | 7/2003 |
| JP | A-2008-168714 | 7/2008 |
| JP | A-2011-221686 | 11/2011 |

OTHER PUBLICATIONS

Sep. 2, 2014 Office Action issued in Japanese Patent Application No. 2010-272018 (with partial translation).
Notice of Rejection issued in Japanese Patent Application No. 2010-272018 dated Feb. 18, 2014 (w/ translation).

* cited by examiner

*Primary Examiner* — Dave Czekaj
*Assistant Examiner* — Mohammad J Rahman
(74) *Attorney, Agent, or Firm* — Oliff PLC

(57) ABSTRACT

An in-vehicle apparatus includes an image-capturing part that is installed on a vehicle and captures an image of a periphery of the vehicle, an image generator that generates a bird's-eye image including the vehicle and the periphery of the vehicle viewed from a virtual viewpoint based on the image captured by the image-capturing part, and a transmitter that transmits the bird's-eye image to a terminal. The image generator changes the virtual viewpoint based on a change request from the terminal and generates the bird's-eye image viewed from the virtual viewpoint after changing the virtual viewpoint.

18 Claims, 25 Drawing Sheets

IN-VEHICLE APPARATUS

BACKGROUND OF THE INVENTION

1. Field of the Invention

The invention relates to technology that provides an image from a vehicle.

2. Description of the Background Art

Recently, various types of antitheft apparatus for installation in a vehicle are proposed to protect a vehicle against theft. In an example, when a lock of a vehicle door or a car window such as a windshield is broken, a type of in-vehicle apparatus sounds an alarm or lights a lamp. When a suspicious person approaches a vehicle as well, an in-vehicle security system detects the approaching suspicious person, sounds an alarm and transmits a message to the mobile terminal of a vehicle owner. A technology newly proposed as a security system allows a user to confirm concurrently the vehicle inside and outside.

If apparatus sounds an alarm against the every person approaching a vehicle, the alarm is sounded even against a non-suspicious person. This bothers the persons near the parked vehicle due to its noisy alarm. Besides, the vehicle owner cannot confirm the vehicle state unless the owner goes to the parked vehicle. Further, even if the owner goes to the parked vehicle to confirm the vehicle state, the owner cannot confirm the vehicle state at the time of the alarm sounded.

SUMMARY OF THE INVENTION

According to one aspect of the invention, an in-vehicle apparatus that is used in a vehicle includes an image-capturing part that is installed on the vehicle and captures an image of a periphery of the vehicle, an image generator that generates a bird's-eye image including the vehicle and the periphery of the vehicle viewed from a virtual viewpoint based on the image captured by the image-capturing part, and a transmitter that transmits the bird's-eye image to a terminal. The image generator changes the virtual viewpoint based on a change request from the terminal and generates the bird's-eye image viewed from the virtual viewpoint after changing the virtual viewpoint.

Since a user can confirm the bird's-eye image viewed from the virtual viewpoint after changing the virtual viewpoint, the user can confirm the periphery of the vehicle precisely.

According to another aspect of the invention, the in-vehicle apparatus further includes a sensor that detects a target in the periphery of the vehicle, and the image generator starts generating the bird's-eye image when the sensor has detected the target in the periphery of the vehicle.

Since the image generator starts generating the bird's-eye image when the sensor has detected the target in the periphery of the vehicle, the user can confirm the target in the periphery of the vehicle precisely.

According to another aspect of the invention, the transmitter transmits the image captured by the image-capturing part based on a transmit request from the terminal.

Since the transmitter transmits the image captured by the image-capturing part based on the transmit request from the terminal, the user can confirm the periphery of the vehicle at the time corresponding to the transmit request from the terminal.

Therefore, the object of the invention is to detect a target approaching a vehicle and provide to a user of the vehicle the data for judging whether an alarm against the target approaching the vehicle is given.

These and other objects, features, aspects and advantages of the invention will become more apparent from the following detailed description of the invention when taken in conjunction with the accompanying drawings.

DESCRIPTION OF THE EMBODIMENTS

Hereafter, embodiments of the invention will be described in reference to drawings. Configurations of the following embodiments are examples and the invention is not to be considered limited to the configurations of the embodiments of the invention.

Figure 1:
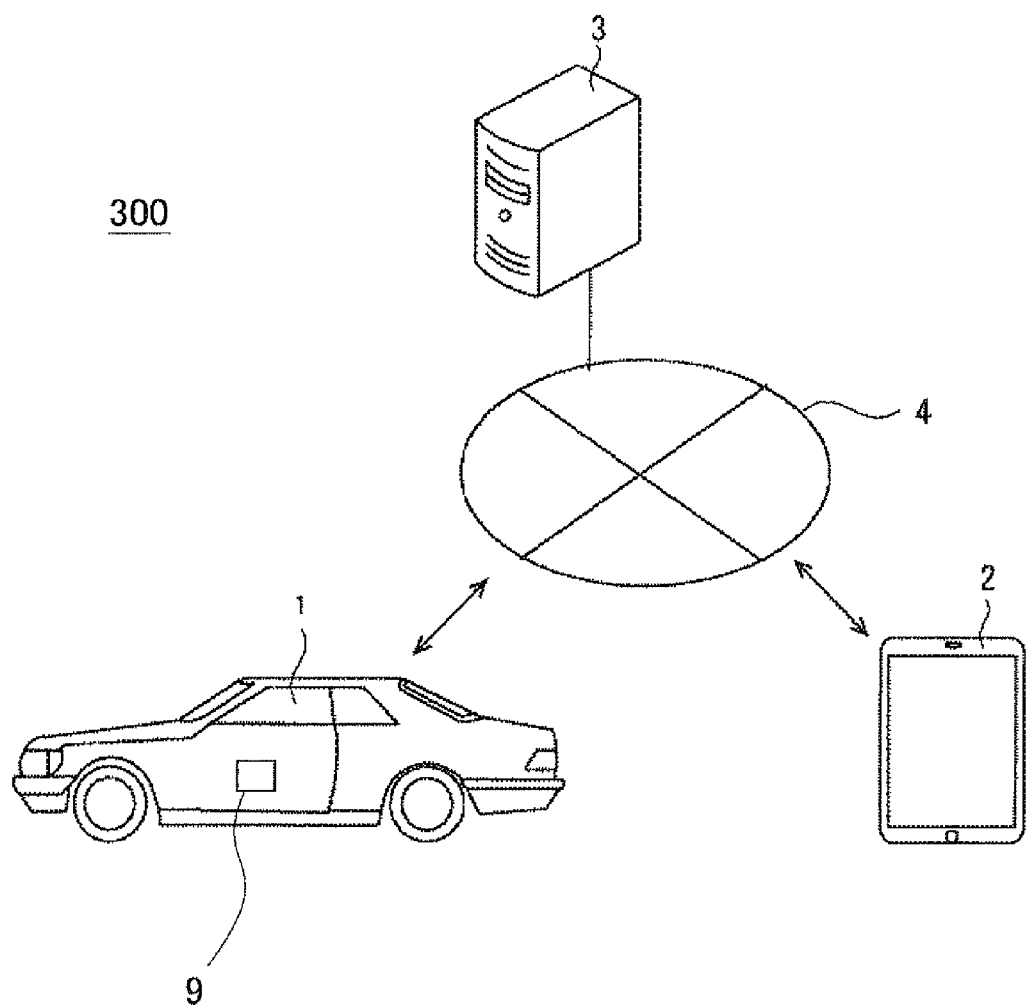
FIG. 1 shows a schematic diagram of an image display system of the embodiment.

FIG. 1 shows a schematic diagram of an image display system 300 of the embodiment. As shown in FIG. 1, the image display system 300 of the embodiment includes an in-vehicle apparatus 9 for installation in a vehicle 1, a mobile terminal 2 and a server 3. The vehicle 1, the mobile terminal 2 and the server 3 are interconnected in a network 4. The in-vehicle apparatus 9 provides an image obtained by the vehicle 1 to the mobile terminal 2.

<Configuration of Vehicle 1>

Figure 2:
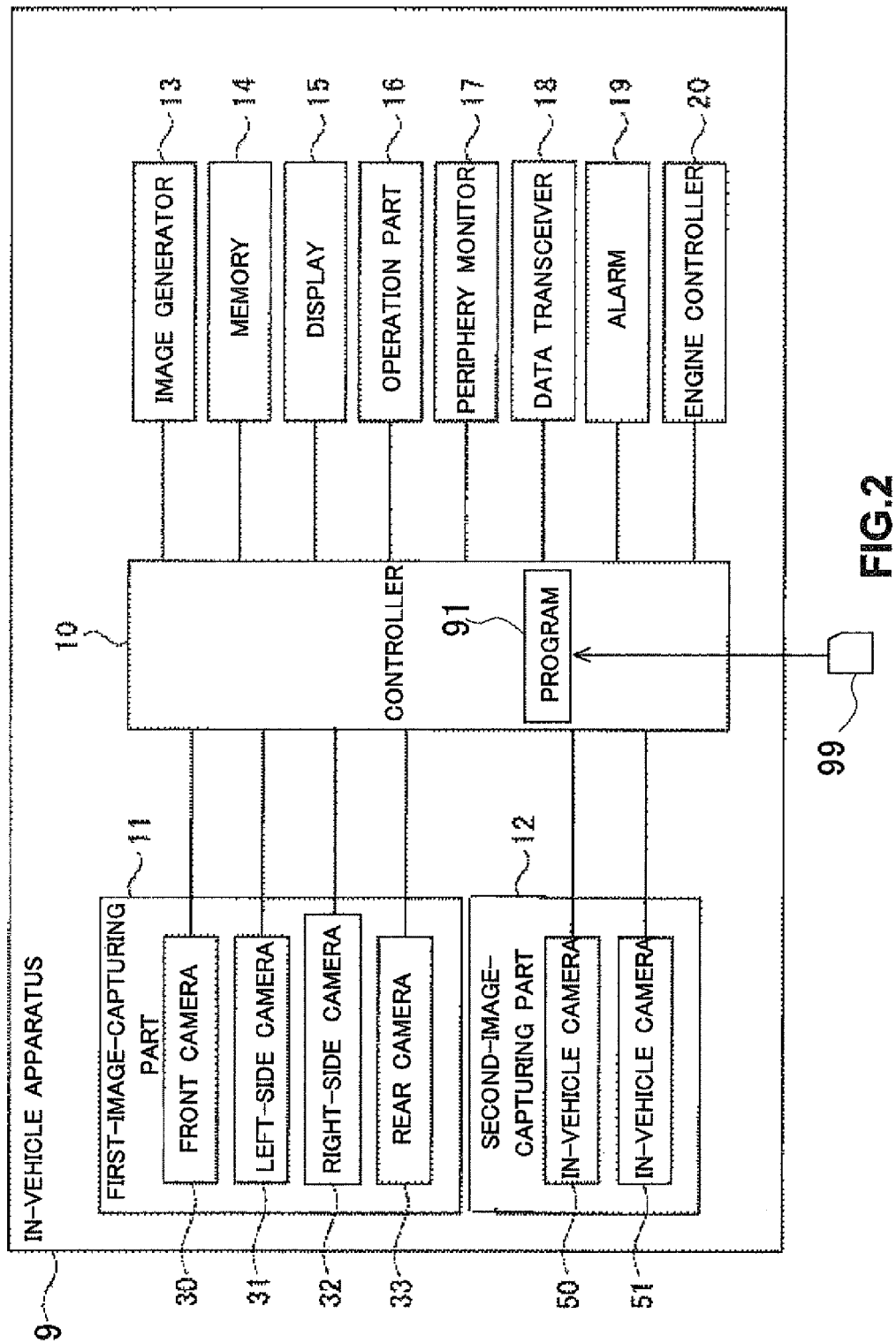
FIG. 2 shows a block diagram of a configuration of in-vehicle apparatus for installation in a vehicle.

FIG. 2 shows a block diagram of a configuration of the in-vehicle apparatus 9 for installation in the vehicle 1. As shown in FIG. 2, the in-vehicle apparatus 9 includes a controller 10 functioning as an anti-theft controller, the first-image-capturing part 11, the second-image-capturing part 12, an image generator 13, a memory 14, a display 15, an operation part 16, a periphery monitor 17, a data transceiver 18, an alarm 19, and an engine controller 20. The controller 10 has a computer including a CPU (Central Processing Unit), a RAM (Random Access Memory) and a ROM (Read Only Memory). The controller 10 implements various controls based on CPU processing according to a program 91 stored in the ROM. The in-vehicle apparatus 9 reads out the program 91 for acquisition from a non-transitory computer-readable recording medium 99 such as a memory card storing programs, via a reader not shown in figures.

The first-image-capturing part 11 has a front camera 30 for forward monitoring, a left-side camera 31 for left-side monitoring, a right-side camera 32 for right-side monitoring, and a rear camera 33 for backward monitoring. Each of the front camera 30, the left-side camera 31, the right-side camera 32 and the rear camera 33, having a lens and an image sensor, obtains an image electronically. Each of the front camera 30, the left-side camera 31, the right-side camera 32 and the rear camera 33 is disposed at an appropriate position outside the vehicle 1. Each of the front camera 30, the left-side camera 31, the right-side camera 32 and the rear camera 33 is available in arbitrary pointing directions. Each of the mounts for the front camera 30, the left-side camera 31, the right-side camera 32 and the rear camera 33 is equipped with a servomotor. Driving of the servomotor based on a signal transmitted from the controller 10 enables each of the front camera 30, the left-side camera 31, the right-side camera 32 and the rear camera 33 to point at an arbitrary direction.

Figure 3:
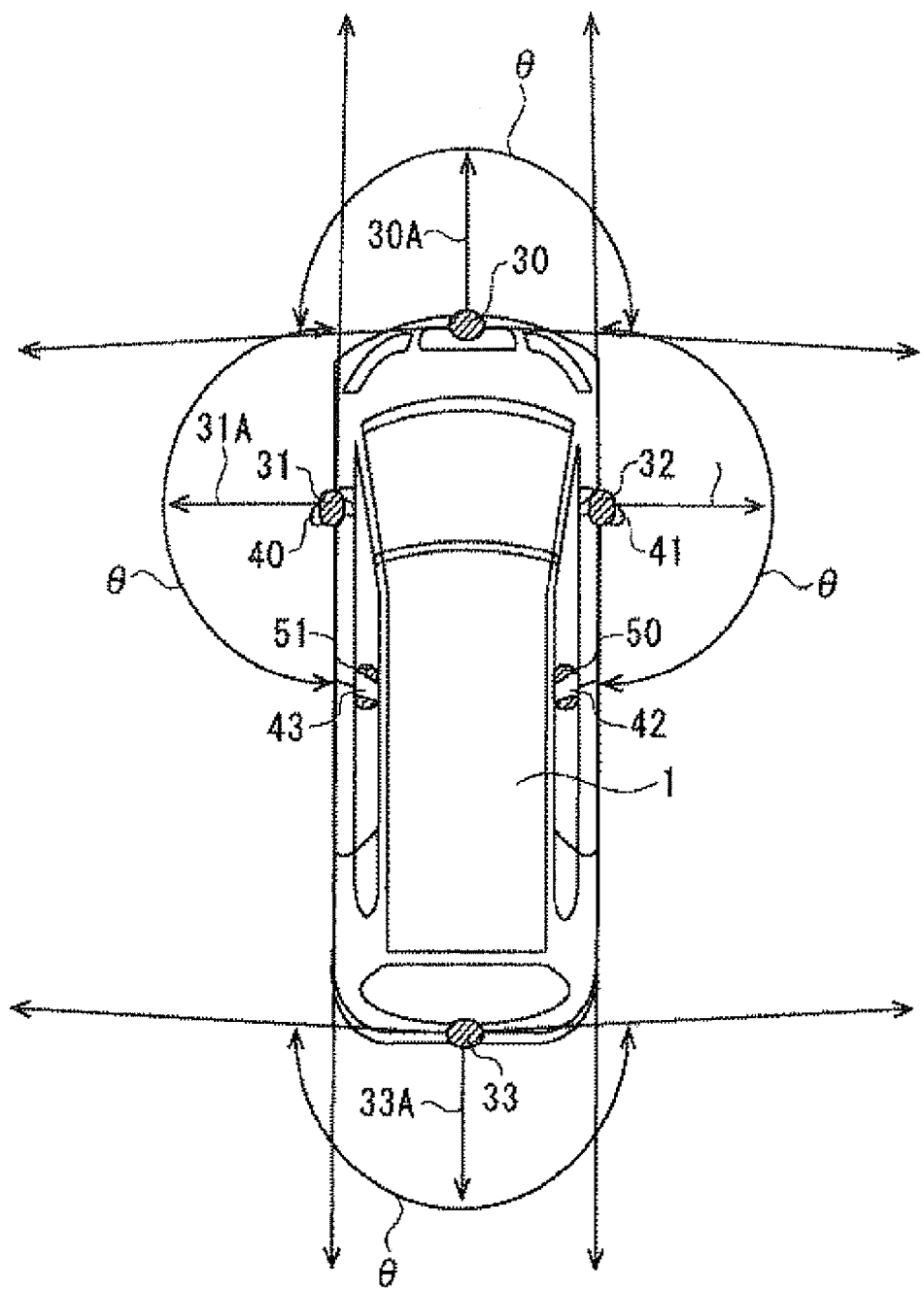
FIG. 3 shows positions for installation of a front camera, a left-side camera, a right-side camera and a rear camera in the vehicle.

FIG. 3 shows positions for installation of the front camera 30, the left-side camera 31, the right-side camera 32, and the rear camera 33 on the vehicle 1. The front camera 30 is disposed at the front part of the vehicle 1. The front camera 30 may be disposed, for example, at the position near a license plate at the front end of the vehicle 1. An optical axis 30A of the front camera 30 points straightly at a forward direction of the vehicle 1. The left-side camera 31 is disposed at the left side of the vehicle 1. The left-side camera 31 may be disposed, for example, on a door mirror 40 of the vehicle 1. The right-side camera 32 is disposed at the right side of the vehicle 1. The right-side camera 32 may be disposed, for example, on a door mirror 41 of the vehicle 1. An optical axis 31A of the left-side camera 31 and an optical axis 32A of the right-side camera 32 point outside the vehicle 1 along a left-right direction (direction perpendicular to the straight-ahead direction) of the vehicle 1. The rear camera 33 is disposed at the rear part of the vehicle 1. The rear camera 33 may be disposed, for example, at the position near a license plate of the rear of the vehicle 1. An optical axis 33A of the rear camera 33 points to a direction opposite to the straight-ahead direction.

Each of the front camera 30, the left-side camera 31, the right-side camera 32 and the rear camera 33 adopts a lens such as a fish-eye lens. Each of the front camera 30, the left-side camera 31, the right-side camera 32 and the rear camera 33 has a view angle θ, 180 degrees or more. Therefore, using the front camera 30, the left-side camera 31, the right-side camera 32 and the rear camera 33 enables capturing periphery images (entire periphery images) of the vehicle 1. The video data of the captured periphery images of the vehicle 1 captured by the first-image-capturing part 11 is stored in the memory 14.

Here is a description of FIG. 2 again. The second-image-capturing part 12 has an in-vehicle camera 50 for monitoring the left-outside of the vehicle, and an in-vehicle camera 51 for monitoring the right-outside of the vehicle. Each of the in-vehicle camera 50 and the in-vehicle camera 51, having a lens and an image sensor, obtains an image electronically. Each of the in-vehicle camera 50 and the in-vehicle camera 51 is disposed at an appropriate position of the vehicle cabin inside the vehicle 1. As shown in FIG. 3, the in-vehicle camera 50 is disposed on a right-side pillar 42 so as to point to the vehicle cabin direction of the vehicle 1. Therefore, the in-vehicle camera 50 can capture an image including the vehicle cabin of the vehicle 1 and the left-side outside of the vehicle 1. As shown in FIG. 3, the in-vehicle camera 51 is disposed on a left-side pillar 43 so as to point to the vehicle cabin direction of the vehicle 1. Therefore, the in-vehicle camera 51 can capture an image including the vehicle cabin of the vehicle 1 and the right-outside of the vehicle 1. Each of the in-vehicle camera 50 and the in-vehicle camera 51 is available in arbitrary pointing directions. Each of the mounts for the in-vehicle camera 51 and the in-vehicle camera 52 is equipped with a servomotor. Driving of the servomotor based on the signal transmitted from the controller 10 causes the in-vehicle camera 51 or the in-vehicle camera 52 to point to an arbitrary direction. The video data of the captured images including the vehicle cabin of the vehicle 1, the left-outside of the vehicle 1 and the right-outside of the vehicle 1 captured by the second-image-capturing part 12, is stored in the memory 14.

In the embodiment, a camera 200 is used as a generic name in terms of the front camera 30, the left-side camera 31, the right-side camera 32, the rear camera 33, the in-vehicle camera 50 and the in-vehicle camera 51, or used for the case of indicating one or more of the cameras of the front camera 30, the left-side camera 31, the right-side camera 32, the rear camera 33, the in-vehicle camera 50 and the in-vehicle camera 51.

Here is a description of FIG. 2 again. The image generator 13 generates a composite image by processing the images captured by the first-image-capturing part 11. The image generator 13 has a hardware circuit allowing various types of image processing. The image generator 13 adjusts the image captured by the first-image-capturing part 11. Concretely, the image generator 13 implements image processing for the captured image, such as luminance adjustment. The image generator 13 generates a composite image showing the periphery of the vehicle 1 viewed from an arbitrary virtual viewpoint around the vehicle 1, based on the plurality of images captured by the first-image-capturing part 11.

<Image Composite Processing>

Figure 4:
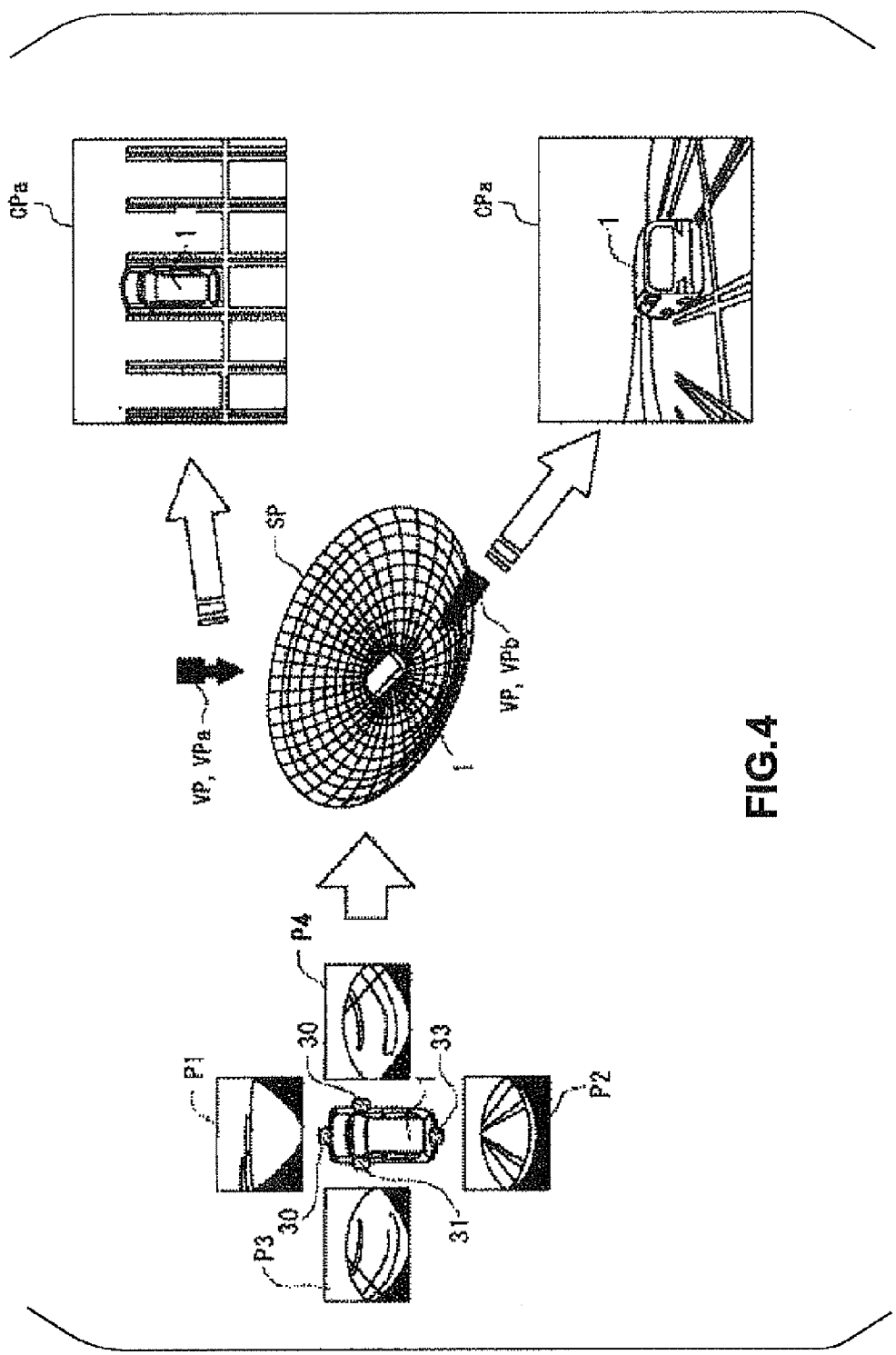
FIG. 4 describes a method for generating a composite image.

Here is a description of the method for generating a composite image showing the periphery of the vehicle 1 viewed from the arbitrary virtual viewpoint around the vehicle 1, based on the plurality of the images captured by the first-image-capturing part 11. FIG. 4 describes a method for generating the composite image.

When the front camera 30, the left-side camera 31, the right-side camera 32 and the rear camera 33 of the first-image-capturing part 11 capture images at a time, four images are obtained: a captured image P1 showing a forward direction of the vehicle 1, a captured image P2 showing a left-side direction, a captured image P3 showing a right-side direction and a captured image P4 showing a rear direction. That is, these four captured images P1, P2, P3 and P4 obtained by the first-image-capturing part 11 include data of the entire periphery of the vehicle 1 at a time of image-capturing.

Next, each pixel on the four captured images P1, P2, P3 and P4 is projected on a curved surface SP of a virtual three-dimensional space. The curved surface SP has, for example, a substantially-hemispherical shape (bowl shape), and the vehicle 1 is to be located at its center (the bottom of the bowl). The correspondence relations between the position of each pixel on the captured images P1, P2, P3 and P4 and the position of each pixel on the curved surface SP are determined in advance. Thus, the value of each pixel on the curved surface SP is determined, based on the value of each pixel included in the captured images P1, P2, P3 and P4, and the correspondence relations between the position of each pixel on the captured images P1, P2, P3 and P4 and the position of each pixel on the curved surface SP. The correspondence relations between the position of each pixel on the captured images P1, P2, P3 and P4 and the position of each pixel on the curved surface SP are depended on the positions (relative distances, ground heights, optic axis angles, etc.) of the front camera 30, the left-side camera 31, the right-side camera 32 and the rear camera 33. The data table indicating these correspondence relations between the position of each pixel on the captured images P1, P2, P3 and P4 and the position of each pixel on the curved surface SP are stored in the memory 14 in advance. The memory 14 is, for example, a nonvolatile memory.

A polygon model indicating a three-dimensional shape of the vehicle 1 is generated in virtual, by use of data including a shape and sizes of a vehicle stored in the memory 14 in advance. The generated image of the vehicle 1 is located at the center of the substantially-hemispherical shape, which is prescribed as the location of the vehicle 1, in the three-dimensional space including the curved surface SP.

The controller 10 sets up a virtual viewpoint VP in the three-dimensional space including the curved surface SP. The virtual viewpoint VP is specified by a viewpoint position and a pointing direction: the arbitrary viewpoint position corresponding to the periphery of the vehicle 1, and the arbitrary pointing direction in the three-dimensional space including the curved surface SP. Based on the set position of the virtual viewpoint VP, the required area on the curved surface SP is clipped as an image. The predetermined relations between the virtual viewpoint VP and the required area on the curved surface SP are stored in the data table of the memory 14. On the other hand, the polygon model is rendered in two dimensions based on the set position of the virtual viewpoint VP, and then, the generated two-dimensional image of the vehicle 1 is superposed on the clipped image. In this way, a composite image showing the vehicle 1 and the periphery of the vehicle 1 viewed from an arbitrary virtual viewpoint is generated.

In an example, as shown in FIG. 4, when a virtual viewpoint VPa is specified by the viewpoint position on the substantial center right above the vehicle 1 and by the pointing direction to the right under, the generated composite image CPa shows the vehicle 1 and the periphery of the vehicle 1 viewed from the position on right above the vehicle 1. In another example, as shown in FIG. 4, when the virtual viewpoint VPb is specified by the viewpoint position on the rear left of the vehicle 1 and by the pointing direction to the substantial front of the vehicle 1, the generated composite image CPb shows the vehicle 1 and the entire periphery of the vehicle 1 viewed from the position of the rear left of the vehicle 1. In the actual case where the image generator 13 generates the composite image, there is no need to decide all of the pixel values of the curved surface SP. To improve the processing speed, only the pixel values of the area required for generating the composite image corresponding to the placed virtual viewpoint are needed to be decided based on the captured images P1, P2, P3 and P4. Further, storing the image of the vehicle 1 for use in the composite image as a bitmap image in advance in the memory 14 enables speedy processing of the image generator 13 only by superposing the image of the vehicle 1 corresponding to the pointing direction of the virtual viewpoint on the generated composite image.

As above, the image generator 13 generates a composite image showing the vehicle 1 and the entire periphery of the vehicle 1 viewed from a bird's-eye viewpoint, or a composite image showing only a part of the periphery of the vehicle 1, based on the plurality of the images captured by the first-image-capturing part 11. In the embodiment, a bird's-eye image of the vehicle 1 refers to the composite image showing the vehicle 1 and the entire periphery of the vehicle 1 viewed from a bird's-eye viewpoint or the composite image showing only a part of the periphery of the vehicle 1.

Here is a description of FIG. 2 again. The display 15 is, for example, a liquid crystal display having a touch panel function. The operation part 16 has, for example, a hardware switch for user operation. Various instructions by a user are received at the operation part 16 or the display 15 functioning as a touch panel.

The in-vehicle apparatus 9 may be configured so that the controller 10 causes the display 15 to display the composite image generated by the image generator 13 when the predetermined conditions are met. One example of the predetermined conditions to be met is the case where an ignition switch not shown in figures is turned on.

The periphery monitor 17 detecting a vehicle approaching the vehicle 1 is, for example, short-range millimeter-wave radar for measuring a position of a target, a distance from the vehicle 1 to the target, a velocity of the target and a direction (angle θ) to the target. They are measured based on the time taken from transmission of millimeter waves to reception of the radio waves reflected at the target as well as the difference in frequency caused by Doppler Effect. A watching area of the periphery monitor 17 is set at approximately 3 meters. The targets detected by the periphery monitor 17 are humans, animals other than humans, vehicles, etc. UWB radar, for example, may be used as millimeter-wave radar. The periphery monitor 17 may be radar transmitting and receiving radio waves other than millimeter waves (e.g. microwaves), light, laser, or ultrasonic waves. The periphery monitor 17 may be buried in a bumper of the vehicle 1. On the vehicle 1, a plurality of the periphery monitors 17 may be disposed. The periphery monitors 17 may be buried, for example, in a front bumper, a rear bumper and a door of the vehicle 1.

Figure 5:
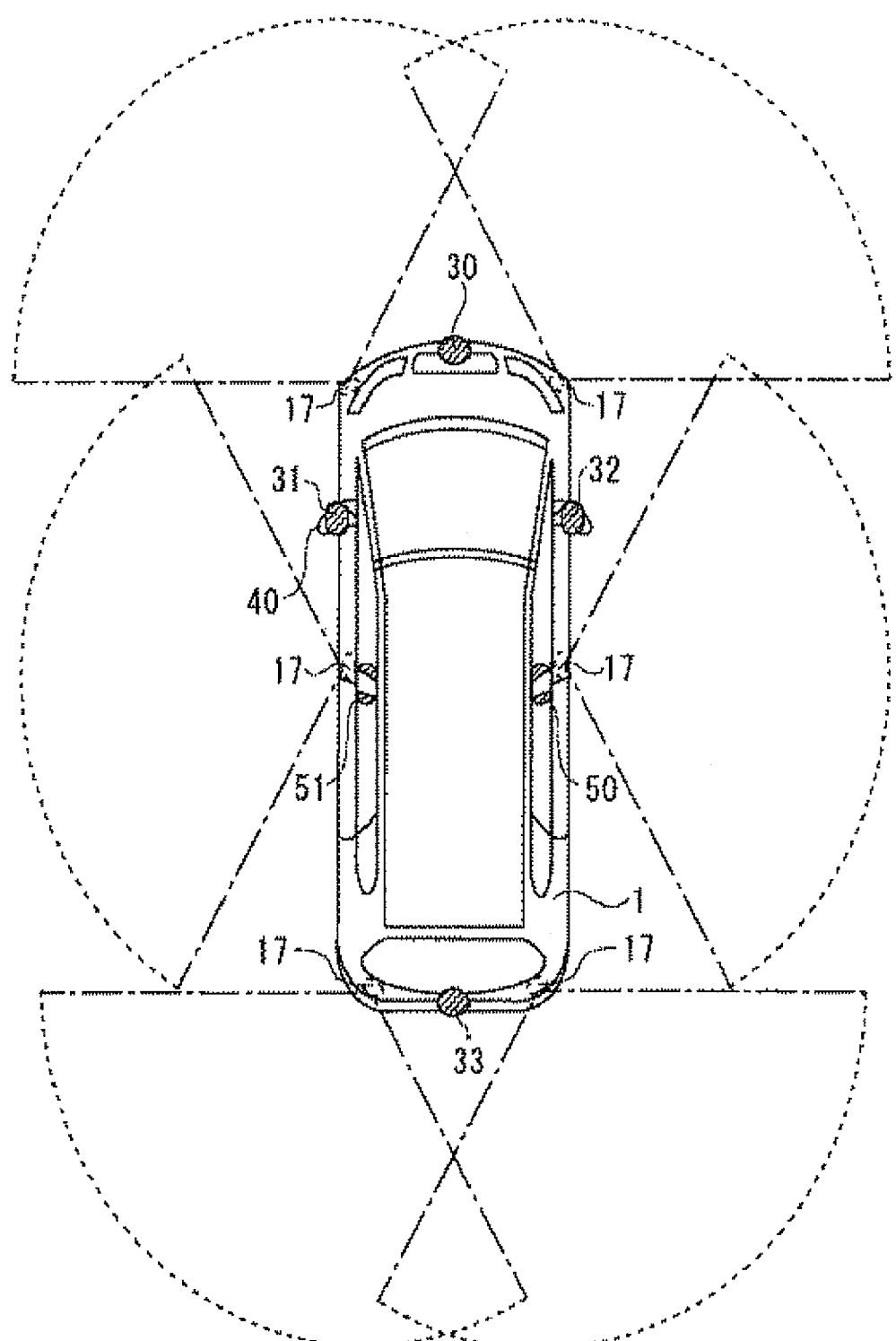
FIG. 5 shows an example that periphery monitors are buried in a front bumper, a rear bumper and doors of the vehicle.

FIG. 5 shows an example that the periphery monitors 17 are buried in a front bumper, a rear bumper and doors of the vehicle 1. In FIG. 5, the area formed by two edge lines of chain lines extending from the periphery monitor 17 shows detectable area of the periphery monitor 17. In FIG. 5, the detectable viewing angle of the periphery monitor 17 is 120 degrees. The detectable area and viewing angle of the periphery monitor 17 are not limited to the ones in FIG. 5 because they vary depending on radar for use as the periphery monitor 17. Short range detection radar may be used as the periphery monitor 17 on the vehicle 1 equipped with the short range detection radar originally for use as an under-heavy-traffic following function at a low speed.

Further, a monitoring camera for detecting targets may be used as the periphery monitor 17. When the monitoring camera is used as the periphery monitor 17, the periphery monitor 17 may be disposed so as to capture images of the periphery of the vehicle 1. The front camera 30, the left-side camera 31, the right-side camera 32 and the rear camera 33, or the in-vehicle cameras 50 and 51 may be used as the monitoring cameras. When the monitoring camera is used, the controller 10 analyzes the images captured by the monitoring camera to detect any target approaching the vehicle 1.

The periphery monitor 17 detects a target in the area at a predetermined interval (e.g. dozens of milliseconds), and outputs to the controller 10 various data including a position of the target, a distance from the vehicle 1 to the target, a velocity of the target and a direction to the target. The controller 10 receives the data including the position of the target, the distance from the vehicle 1 to the target, the velocity of the target and the direction to the target, output by the periphery monitor 17.

Here is a description of FIG. 2 again. The data transceiver 18 sends to the mobile terminal 2 an e-mail including data of the bird's-eye still image of the vehicle 1 or data of the bird's-eye video of the vehicle 1, based on a signal from the controller 10. The data transceiver 18 also receives a signal requesting data of the bird's-eye video of the vehicle 1 from the mobile terminal 2. For example, an in-vehicle DCM (Data Communication Module) may be used as the data transceiver 18. The alarm 19 gives an alarm in accordance with a signal from the controller 10. The alarm includes one or more of the followings: lightening of headlights, flashing of hazard lamps, sound output of a horn or a siren, and audio output by audio output apparatus. The engine controller 20 controls an engine for start or stop.

The controller 10 functions as anti-theft apparatus. When predetermined conditions are met, the controller 10 shifts into an alert mode to cause the periphery monitor 17 to monitor an approaching target. One example of the predetermined conditions to be met is the case where the following two conditions are met at a time: (1) an ignition switch not shown in figures is off, (2) all doors are closed and locked. The control contents in the alert mode will be described later.

<Configuration of Mobile Terminal 2>

Figure 6:
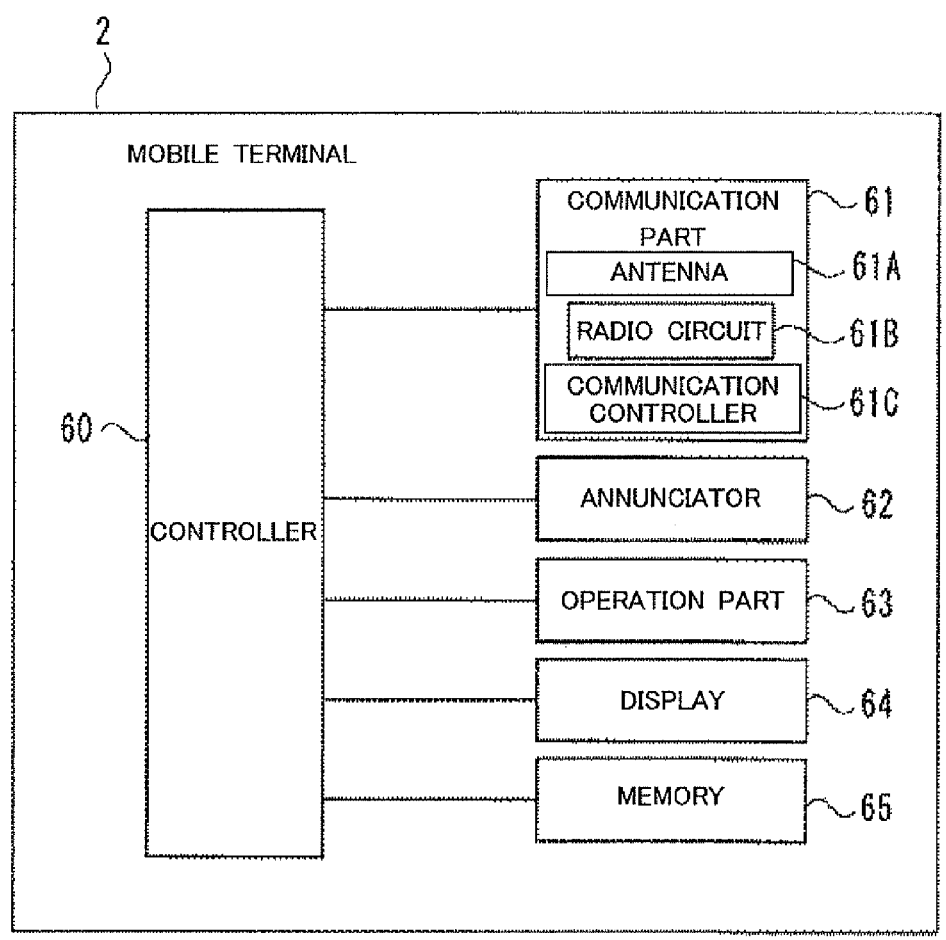
FIG. 6 shows a block diagram of a configuration of a mobile terminal.

FIG. 6 shows a block diagram of a configuration of the mobile terminal 2. As shown in FIG. 6, the mobile terminal 2 includes a controller 60, a communication part 61, an annunciator 62, an operation part 63, a display 64 and a memory 65. The mobile terminal 2 is, for example, a PDA (Personal Digital Assistant), a mobile phone and CE (Consumer Electronics). The mobile terminal 2 is a network-connectable information processor (terminal) for connection to the network 4 and is carried by a user or an owner of the vehicle 1. A network-accessible personnel computer for accessing the network 4 may be used instead of the mobile terminal 2.

The controller 60 is configured with a personal computer having a CPU (Central Processing Unit), a RAM (Random Access Memory) and a ROM (Read Only Memory). The controller 60 implements various controls based on CPU processing according to a predetermined program stored in the ROM.

The communication part 61 has an antenna 61A, a radio circuit 61B and a communication controller 61C. The antenna 61A, the radio circuit 61B and the communication controller 61C are communication interfaces used for a telephone call and packet communication by the mobile terminal 2. The antenna MA transmits and receives radio waves for communication between the mobile terminal 2 and a radio base station (not shown in figures). The radio circuit 61B demodulates radio waves received by the antenna 61A to generate reception data. The radio circuit 61B also modulates transmitting data into a predetermined frequency and outputs the modulated signals through the antenna 61A. The communication controller 61C decrypts the demodulated signals generated by the radio circuit 61B. The communication controller 61C also outputs the encoded transmitting data and causes the radio circuit 61B to communicate.

The annunciator 62 is, for example, a speaker or a vibrator. The annunciator 62 generates a sound or a vibration, or a sound and a vibration, in response to a signal from the controller 60. The operation part 63 has operation keys for inputting letters and numbers, and a selection key for making a selection from a predetermined menu. The operation part 63 may be a touch panel type.

The display 64 is, for example, a LCD (Liquid Crystal Display) or an EL display, and displays various data and images. In the case where the operation part 63 is a touch panel type, the touch panel may be formed integrally with the display area of the display 64. The memory 65 is, for example, a flash memory, a SRAM (Static RandomAccess Memory) or a NVRAM (Nonvolatile RandomAccess Memory), and stores the data transmitted or received, application programs, etc.

<Processing Flow for Generating and Transmitting Data of Bird's-Eye Still Image of Vehicle 1>

Figure 7:
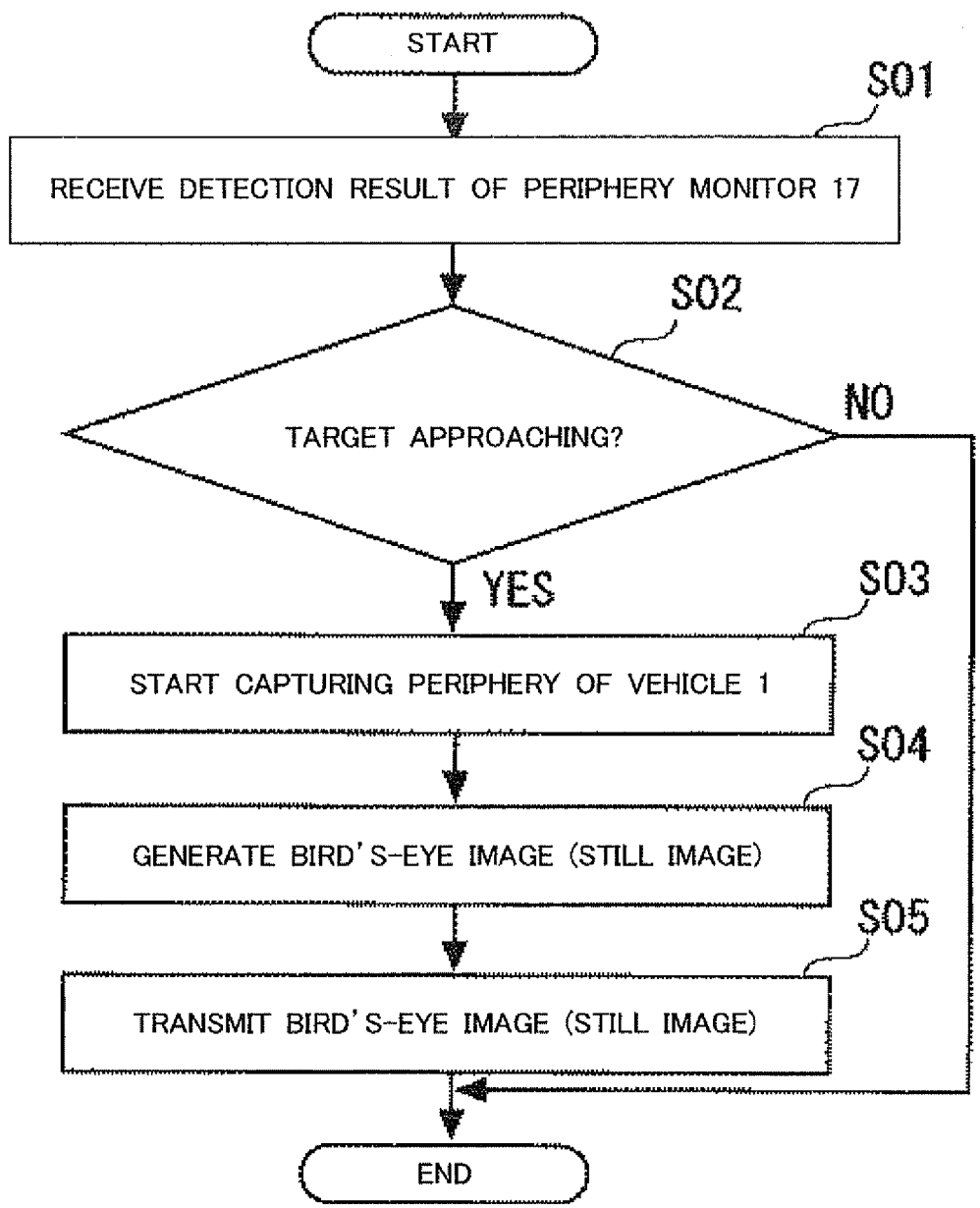
FIG. 7 shows a processing flow for generating and transmitting data of a bird's-eye still image of the vehicle.

FIG. 7 shows a flowchart describing execution by the controller 10 of the in-vehicle apparatus 9 in generating and transmitting data of the bird's-eye still image of the vehicle 1. The processing flow shown in FIG. 7 is started when the controller 10 shifts into an alert mode and repeated at a predetermined cycle. In the processing of step S01 in FIG. 7, the controller 10 receives a detection result by the periphery monitor 17. The detection result by the periphery monitor 17 provides various data including a position of a target, a distance from the vehicle 1 to the target, a velocity of the target and a direction to the target. Next, in the processing of step S02 in FIG. 7, the controller 10 judges whether the target is approaching the predetermined area around the vehicle 1 based on the data including the position of the target, the distance from the vehicle 1 to the target, the velocity of the target and the direction to the target. That is, the controller 10 judges whether there is a possibility that the target may burglarize the own vehicle.

Figure 8:
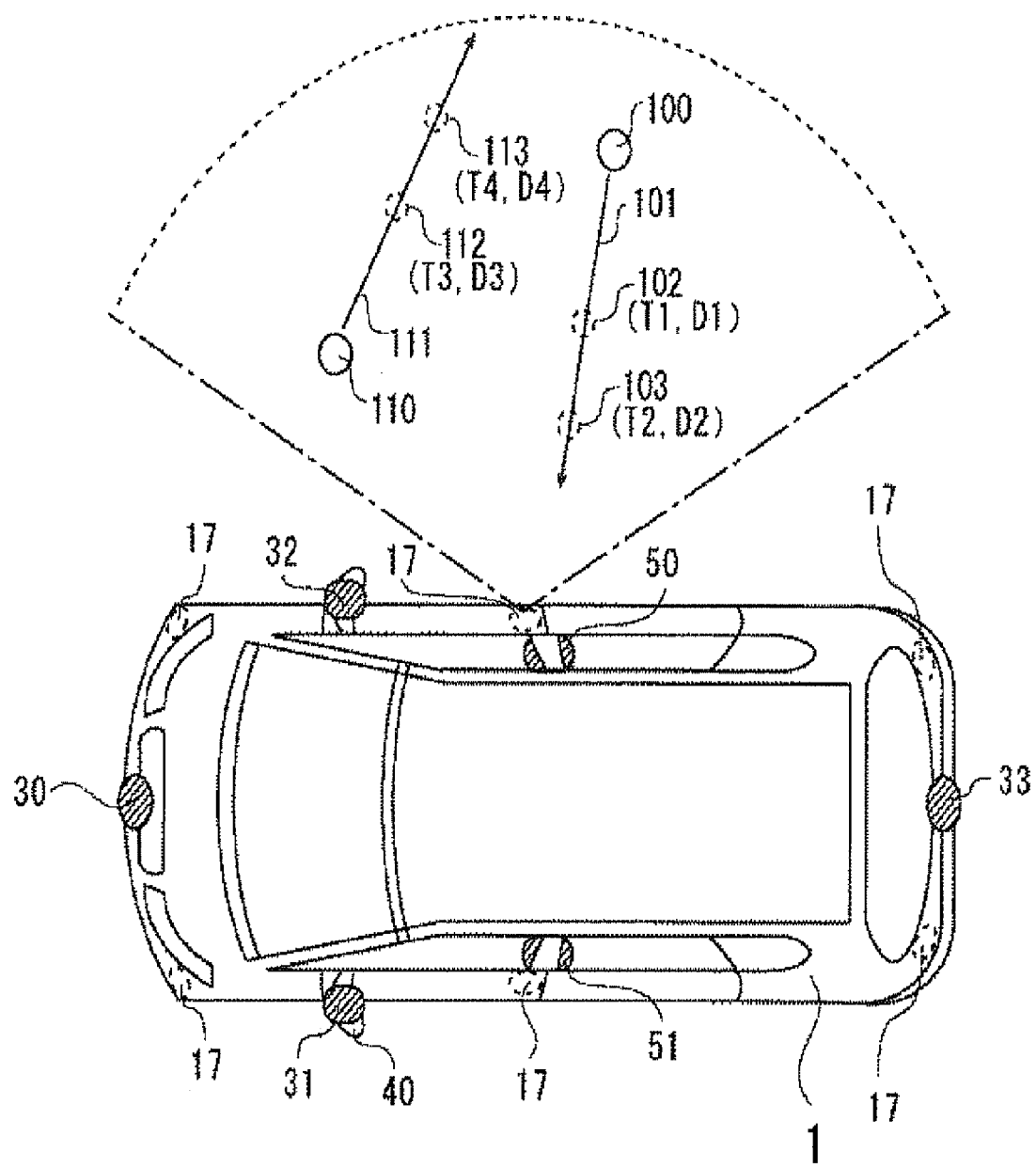
FIG. 8 describes detection of a target.

FIG. 8 shows an example of a target 100 moving along the direction shown by an arrow 101. The periphery monitor 17 detects if the target 100 exists inside the detection area at a predetermined interval, and outputs to the controller 10 the data including the position of the target 100, the distance from the vehicle 1 to the target 100, the velocity of the target 100 and the direction to the target 100. Then, the controller 10 compares a time T1 with a time T2 and also compares a distance D1 with a distance D2. Here, the time T1 and the distance D1 represent respectively the time when the target has reached a position 102 and the distance from the vehicle 1 to the target 100 at the position 102. The time T2 and the distance D2 represent respectively the time when the target 100 has reached a position 103 and the distance from the vehicle 1 to the target 100 at the position 103. In the case where the time T2 is later than the time T1 and the distance D2 is shorter than the distance D1, the controller 10 judges that the target 100 is approaching the vehicle 1.

FIG. 8 also shows another example of a target 110 moving along the direction shown by an arrow 111. The periphery monitor 17 detects if the target 110 exists inside the detection area at a predetermined interval, and outputs to the controller 10 the data including the position of the target 110, the distance from the vehicle 1 to the target 110, the velocity of the target 110 and the direction to the target 110. Then, the controller 10 compares a time T3 with a time T4 and also compares a distance D3 with a distance D4. Here, the time T3 and the distance D3 represent respectively the time when the target 110 has reached a position 112 and the distance from the vehicle 1 to the target 110 at the position 112. The time T4 and the distance D4 represent respectively the time when the target 110 has reached a position 113 and the distance from the vehicle 1 to the target 110 at the position 113. In the case where the time T4 is later than the time T3 and the distance D4 is longer than the distance D3, the controller 10 judges that the target 110 is not approaching the vehicle 1.

In the case where the controller 10 judges that the target is not approaching the predetermined area around the vehicle 1 (No in the processing of step S02 in FIG. 7), the processing flow shown in FIG. 7 ends. On the other hand, in the case where the controller 10 judges that the target is approaching the predetermined area around the vehicle 1 (Yes in the processing of step S02 in FIG. 7), the processing flow moves to step S03 in FIG. 7 in response to the judgment that there is a possibility that the target may burglarize the vehicle. In the processing of step S03 in FIG. 7, the controller 10 turns on the power of the first-image-capturing part 11 and transmits a signal to start capturing an image of the periphery of the vehicle 1 as well. The first-image-capturing part 11 starts capturing the image of the periphery of the vehicle 1 in response to the reception of the signal transmitted from the controller 10 to start capturing the image of the periphery of the vehicle 1. The image data of the periphery of the vehicle 1 captured by the first-image-capturing part 11 is stored in the memory 14. As above, since the first-image-capturing part 11 has the front camera 30, the left-side camera 31, the right-side camera 32 and the rear camera 33, the memory 14 stores a plurality of the captured image data of the periphery of the vehicle 1.

Other conditions may be set for starting image-capturing. Image-capturing may be started when an approaching target enters into the detection area covered by the periphery monitor 17 (e.g. 3-meter area from the periphery monitor 17) regardless of the moving direction. Image-capturing may also be started when the approaching target having been detected in the detectable area (e.g. the detectable area of the periphery monitor 17 set at 3 meters) is further detected near the predetermined second area (e.g. 1-meter area from the periphery monitor 17) that is closer to the vehicle 1.

In the processing of step S04 in FIG. 7, the image generator 13 generates data of the bird's-eye still image of the vehicle 1 based on data of the captured video of the periphery of the vehicle 1 stored in the memory 14. The data of the bird's-eye still image of the vehicle 1 generated by the image generator 13 is stored in the memory 14. In the processing of step S05 in FIG. 7, the controller 10 creates an e-mail attaching the data of the bird's-eye still image of the vehicle 1, and the data transceiver 18 sends to the mobile terminal 2 the e-mail attaching the data of the bird's-eye still image of the vehicle 1. The text on the e-mail attaching the data of the bird's-eye still image of the vehicle 1 indicates a massage concerning the target approaching the vehicle 1. When the data transceiver 18 sends the e-mail attaching the data of the bird's-eye still image of the vehicle 1, the processing flow shown in FIG. 7 ends.

<Processing Flow for Receiving E-Mail and Data of Bird's-Eye Still Image of Vehicle 1>

Figure 9:
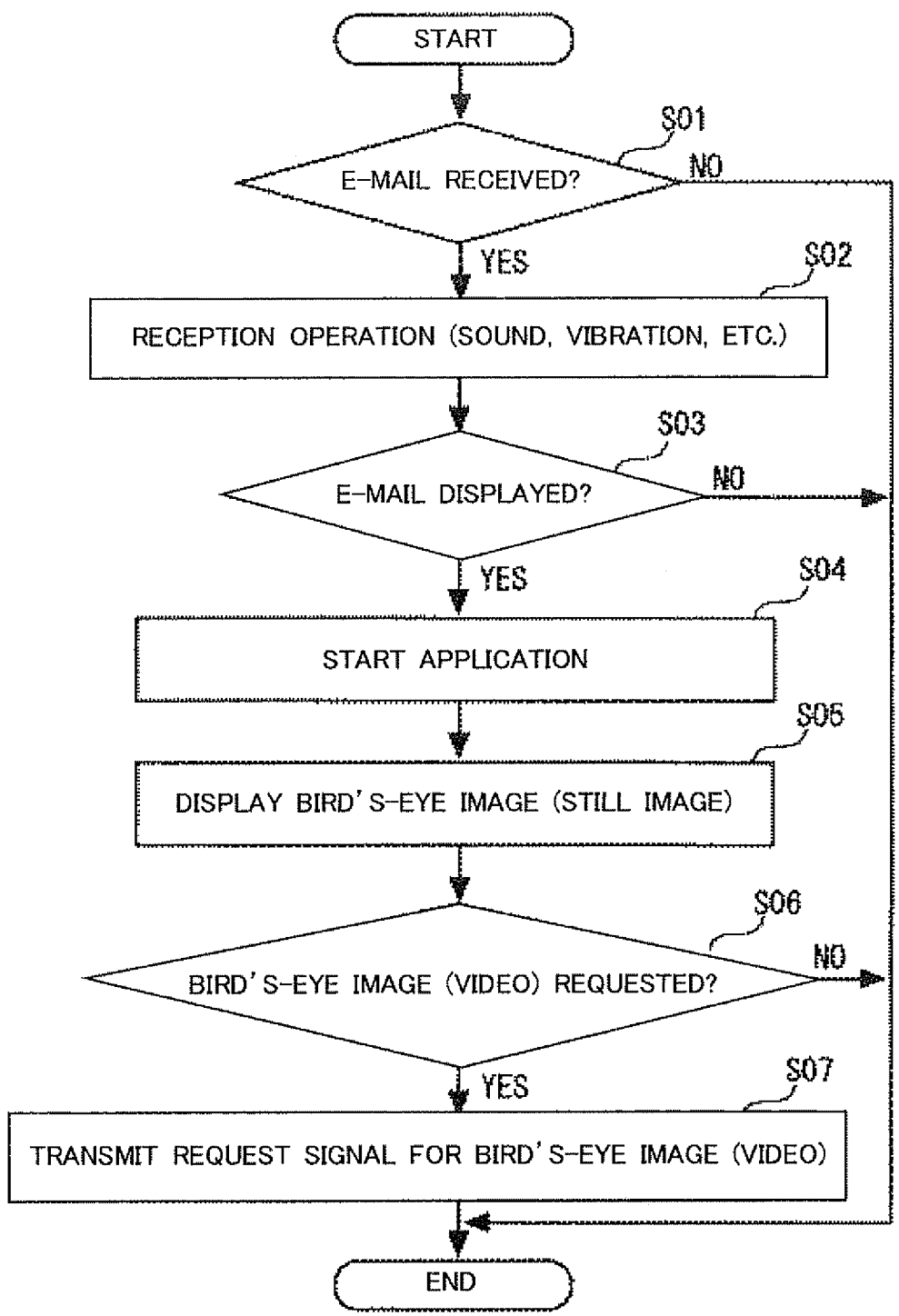
FIG. 9 shows a processing flow for receiving an e-mail and the data of the bird's-eye still image of the vehicle.

FIG. 9 shows a processing flow for receiving an e-mail and the data of the bird's-eye still image of the vehicle 1. The processing shown in FIG. 9 is started, for example, in response to the mobile terminal 2 powered on. In the processing of step S01 in FIG. 9, the controller 60 judges whether the communication part 61 has received the e-mail. In the case where the e-mail has been received by the communication part 61, the processing flow moves to step S02 in FIG. 9. On the other hand, in the case where the e-mail has not been received by the communication part 61, the processing flow shown in FIG. 9 ends. In the case where the processing flow shown in FIG. 9 ends in response to no e-mail received by the communication part 61, the processing may be started again from step S01 in FIG. 9 after a predetermined interval. When the processing flow shown in FIG. 9 ends in response to no e-mail received by the communication part 61, the processing may also be started again from step S01 in FIG. 9 based on a user direction through the operation part 63.

In the processing of step S02 in FIG. 9, the annunciator 62 operates for informing a user of e-mail reception based on the signal from the controller 60. The annunciator 62 generates, for example, a sound or a vibration to inform a user of the e-mail reception. The display 64 indicates a message concerning e-mail reception based on the signal from the controller 60.

In the processing of step S03 in FIG. 9, the controller 60 judges whether the text on the e-mail attaching the data of the bird's-eye still image of the vehicle 1 is displayed on the display 64. In the case where the text on the e-mail attaching the data of the bird's-eye still image of the vehicle 1 is displayed on the display 64, the processing flow moves to step S04 in FIG. 9. On the other hand, in the case where the text on the e-mail attaching the data of the bird's-eye still image of the vehicle 1 is not displayed on the display 64, the processing flow shown in FIG. 9 ends.

The data of the bird's-eye still image is transmitted and received not only by sending and receiving the e-mail attaching the still image data, but by, for example, sending and receiving the address on a communication network storing the bird's-eye image. In this case, a so-called URL (Uniform Resource Locator) is available. In an example, the communication part 61 may receive the still image data through the computer (e.g. the server 3) on the network 4 specified by the URL indicated in an e-mail. In this case, the data transceiver 18 of the vehicle 1 has to transmit the still image data to the computer (e.g. the server 3) on the network 4 in advance. That is, the memory included in the computer (e.g. the server 3) on the network 4 stores the still image data. The video data, but the still image data, may also be transmitted and received.

Figure 10:
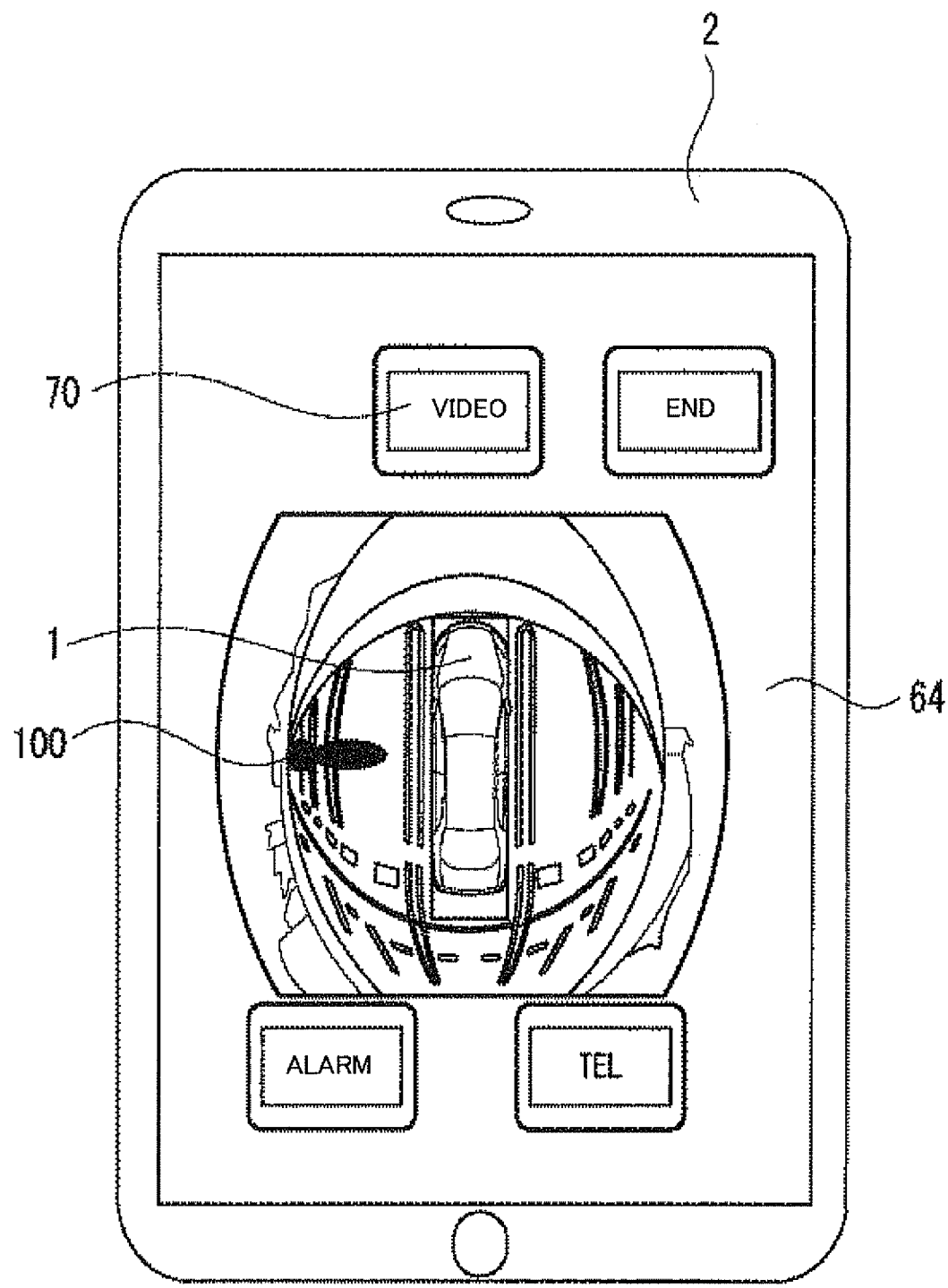
FIG. 10 shows an example of the bird's-eye still image of the vehicle displayed on a display of the mobile terminal.

In the processing of step S04 in FIG. 9, the controller 60 starts an image display application stored in the memory 65. In response to the image display application being run by the controller 60, the communication part 61 obtains image data from the vehicle 1 through the server 3 and the network 4. Next, in the processing of step S05 in FIG. 9, the display 64 displays the bird's-eye still image of the vehicle 1 based on a signal from the controller 60. FIG. 10 shows an example of the bird's-eye still image of the vehicle 1 displayed on the display 64 of the mobile terminal 2. The mobile terminal 2 shown in FIG. 10 adopts a touch panel as the operation part 63, which is formed integrally with the display area of the display 64. The target 100 is displayed simplistically in FIG. 10 of the bird's-eye image of the vehicle 1. However, the target 100 in the bird's-eye still image of the vehicle 1 is actually displayed clearly enough so that a user can judge whether the target 100 is a suspicious person.

In the processing of step S06 in FIG. 9, the controller 60 judges whether the data of a bird's-eye video of the vehicle 1 is requested for reception. The data of the bird's-eye video of the vehicle 1 is requested for reception, for example, by a user through the operation part 63. In an example, in the case where the user touches a button 70 including a word "video"

displayed on the display 64 of the mobile terminal 2 shown in FIG. 10, the controller 60 judges that the data of the bird's-eye video of the vehicle 1 is requested for reception. On the contrary, in the case where the user does not touch the button 70 including the word "video" displayed on the display 64 of the mobile terminal 2 shown in FIG. 10, the controller judges that the data of the bird's-eye video of the vehicle 1 is not requested for reception.

In the case where the data of the bird's-eye video of the vehicle 1 is requested for reception, the processing flow moves to step S07 in FIG. 9. In the case where the data of the bird's-eye still image of the vehicle 1 is not requested for reception, the processing flow shown in FIG. 9 ends.

In the processing of step S07 in FIG. 9, the communication part 61 transmits to the vehicle 1 a request signal for the data of the bird's-eye video of the vehicle 1 based on the signal from the controller 60. When the communication part 61 transmits to the vehicle 1 the request signal for the data of the bird's-eye video of the vehicle 1, the processing flow shown in FIG. 9 ends.

<Processing Flow for Generating and Transmitting Data of Bird's-Eye Video of Vehicle 1>

Figure 11:
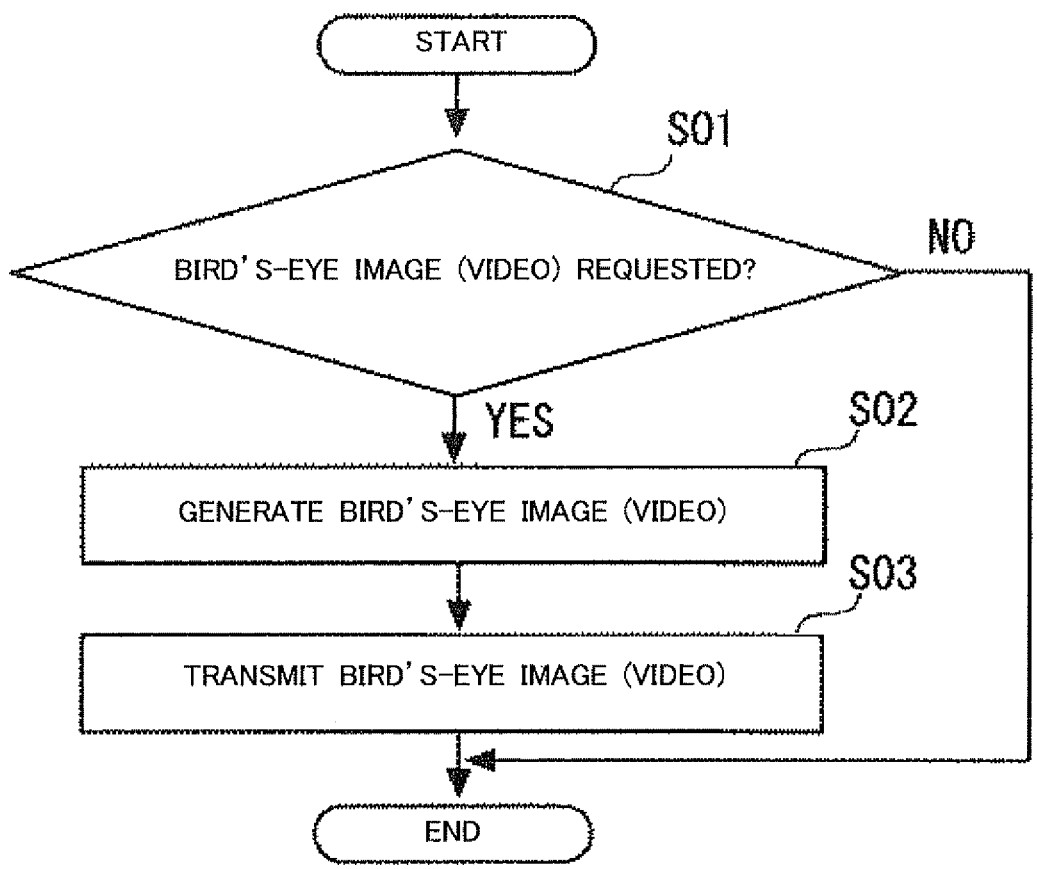
FIG. 11 shows a processing flow for generating and transmitting data of a bird's-eye video of the vehicle.

FIG. 11 shows a processing flow for generating and transmitting the data of bird's-eye video of the vehicle 1. In the case where the processing flow shown in FIG. 7 ends in response to the case where the data transceiver 18 of the in-vehicle apparatus 9 sends to the mobile terminal 2 the e-mail attaching the data of the bird's-eye still image of the vehicle 1, a processing flow shown in FIG. 11 is started. That is, the processing flow shown in FIG. 11 is started after the processing of step S05 shown in FIG. 7 ends.

In the processing of step S01 in FIG. 11, the controller 10 judges whether the data transceiver 18 has received the request signal for the data of bird's-eye video of the vehicle 1. In the case where the data transceiver 18 has received the request signal for the data of bird's-eye video of the vehicle 1 (Yes in the processing of step S01 in FIG. 11), the processing flow moves to step S02 in FIG. 11. In the case where the data transceiver 18 has received no request signal for the data of bird's-eye video of the vehicle 1 (No in the processing of step S1 in FIG. 11), the processing flow shown in FIG. 11 ends. In the case where the processing flow shown in FIG. 11 ends responding to the case where the data transceiver 18 has received no request signal for the data of bird's-eye video of the vehicle 1, the processing flow may return to step S01 in FIG. 11 after a predetermined interval.

In the processing of step S02 in FIG. 11, the image generator 13 generates the data of bird's-eye video of the vehicle 1 based on the video data of the captured image of the periphery of the vehicle 1 stored in time sequence in the memory 14. The data of bird's-eye video of the vehicle 1 generated by the image generator 13 is stored in the memory 14. In the processing of step S03 in FIG. 11, the data transceiver 18 transmits the data of bird's-eye video of the vehicle 1 to the mobile terminal 2. When the data transceiver 18 transmits the data of bird's-eye video of the vehicle 1 to the mobile terminal 2, the processing flow shown in FIG. 11 ends.

<Processing Flow for Switching Display by Use of Mobile Terminal 2 (Part 1)>

Figure 12:
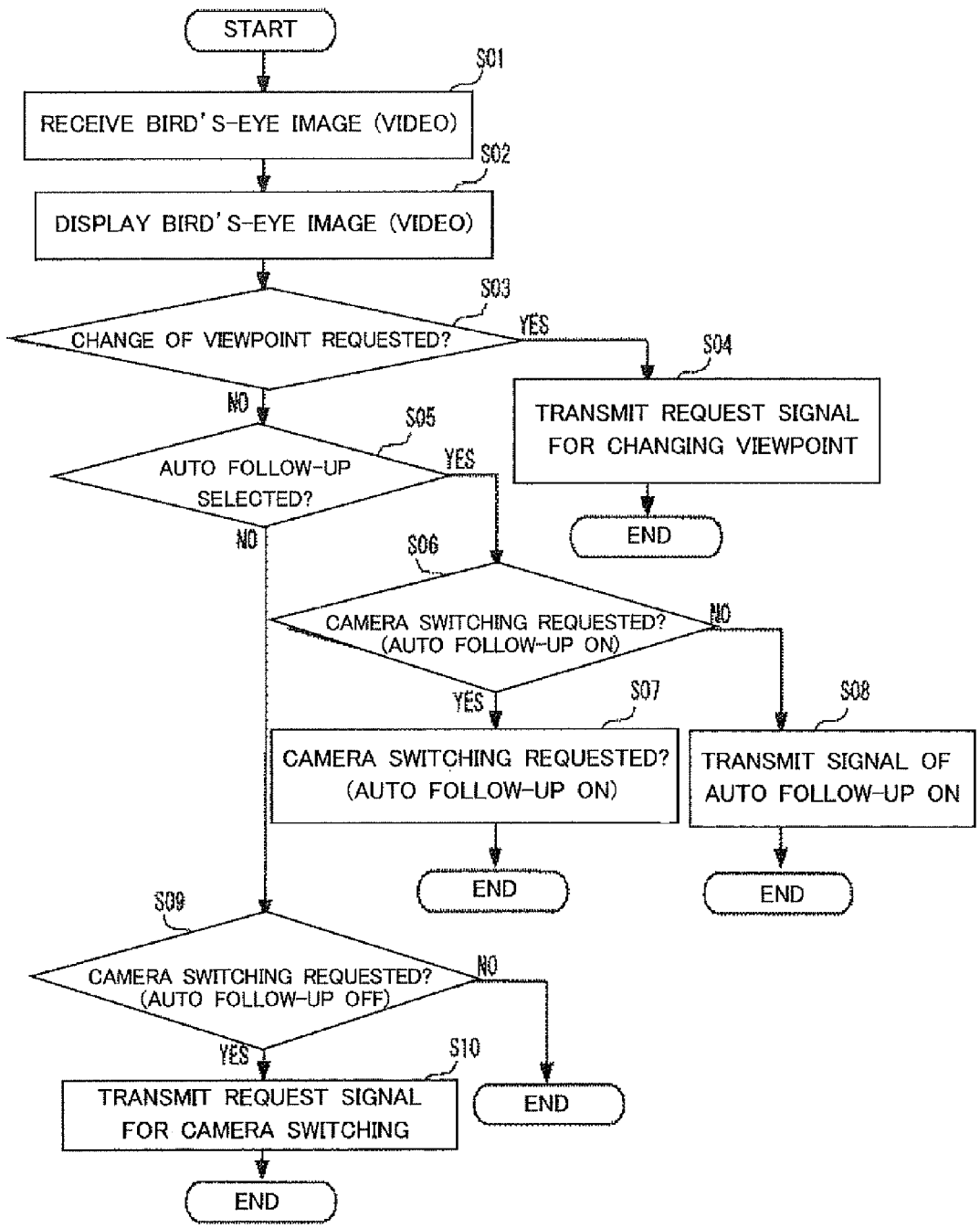
FIG. 12 shows a processing flow for switching display by use of the mobile terminal.

FIG. 12 shows a processing flow for switching display by use of the mobile terminal 2. In the case where the processing flow shown in FIG. 9 ends in response to the case where the communication part 61 of the mobile terminal 2 transmits the request signal for the data of bird's-eye video of the vehicle 1, the processing flow shown in FIG. 12 is started. Or in the case where the processing flow shown in FIG. 9 ends without the communication part 61 of the mobile terminal 2 transmitting the request signal for the data of bird's-eye video of the vehicle 1, the processing flow shown in FIG. 12 is started.

In the processing of step S01 in FIG. 12, the communication part 61 receives from the vehicle 1 the data of bird's-eye video of the vehicle 1. Next, in the processing of step S02 in FIG. 12, the display 64 displays the bird's-eye video of the vehicle 1. In the case where the processing flow shown in FIG. 9 ends without the communication part 61 of the mobile terminal 2 transmitting the request signal for the data of the bird's-eye video of the vehicle 1 in the processing flow shown in FIG. 9, the processing of step S01 and step S02 in FIG. 12 is skipped in the processing flow shown in FIG. 12. Next, here is a description of the case where the display 64 displays the bird's-eye video of the vehicle 1. In the case where the processing of step S01 and step S02 in FIG. 12 is skipped, the processing flow shown in FIG. 12 proceeds with the display 64 keeping showing the bird's-eye still image of the vehicle 1. Thus, in the case where the processing of step S01 and step S02 in FIG. 12 is skipped, the processing flow is implemented by use of "the bird's-eye still image" instead of "the bird's-eye video" indicated in FIG. 12.

Figure 13:
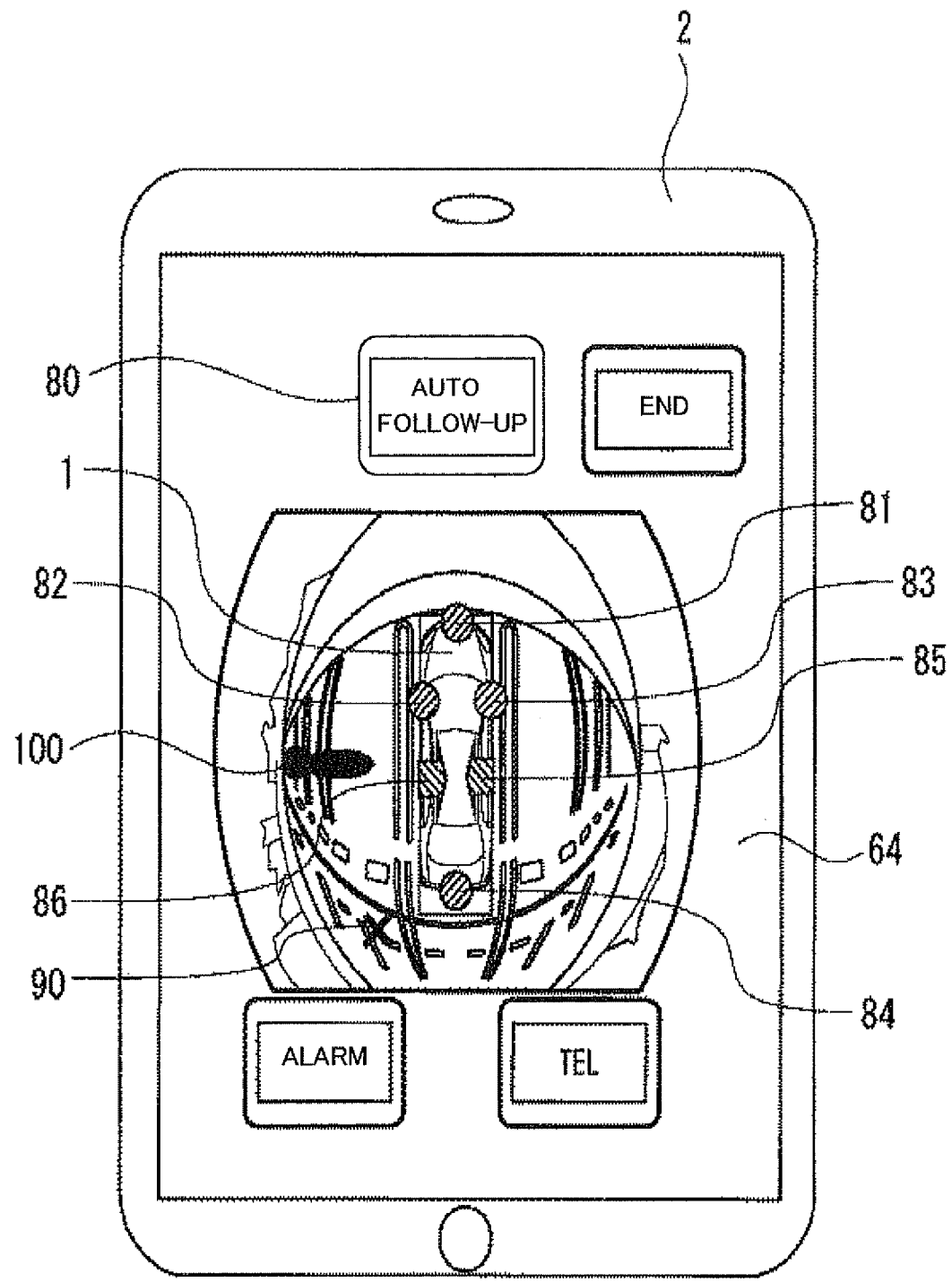
FIG. 13 shows an example of the bird's-eye video of the vehicle displayed on the display of the mobile terminal.

FIG. 13 shows an example of the bird's-eye video of the vehicle 1 displayed on the display 64 of the mobile terminal 2. The mobile terminal 2 shown in FIG. 13 adopts a touch panel as the operation part 63, which is formed integrally with the display area of the display 64. The data of the bird's-eye video of the vehicle 1 includes a mark 81, a mark 82, a mark 83, a mark 84, a mark 85 and a mark 86 (described later) superposed by the controller 10. The target 100 is displayed simplistically in FIG. 13 of the bird's-eye image of the vehicle 1. However, the target 100 in the bird's-eye image of the vehicle 1 is actually displayed clearly enough so that the user can judge whether the target 100 is a suspicious person.

Here is a description of the processing flow in FIG. 12 again. In the processing of step S03 in FIG. 12, the controller 60 judges whether the change of a viewpoint for the bird's-eye image of the vehicle 1 is requested. The change of the viewpoint for the bird's-eye image of the vehicle 1 is requested, for example by a user through the operation part 63. Changing the viewpoint corresponds to changing the virtual viewpoint VP shown in FIG. 4. When the virtual viewpoint VP is changed, a new bird's-eye image of the vehicle 1 is generated based on the position of the new virtual viewpoint VP after changing. In an example, in the case where a user touches the bird's-eye image of the vehicle 1 displayed on the display 64 of the mobile terminal 2 shown in FIG. 13, the controller 60 judges that the change of the viewpoint for the bird's-eye video of the vehicle 1 is requested. On the contrary, when the user does not touch the birds-eye image of the vehicle 1 displayed on the display 64 of the mobile terminal 2 shown in FIG. 13, the controller 60 judges that the change of the viewpoint for the bird's-eye video of the vehicle 1 is not requested.

In the case where the change of the viewpoint for the bird's-eye video of the vehicle 1 is requested (Yes in the processing of step S03 in FIG. 12), the processing flow moves to step S04 in FIG. 12. In the processing of step S04 in FIG. 12, the communication part 61 transmits to the vehicle 1 the request signal for the change of viewpoint position for the bird's-eye video of the vehicle 1, and the position data of the new viewpoint after changing. In an example, in the case where the user touches the bird's-eye image of the vehicle 1 at the position marked with a cross mark 90 on the display 64 of the mobile terminal 2 shown in FIG. 13, the data of the position marked with the cross mark 90 becomes the position data of the new viewpoint after changing. When the communication part 61 transmits to the vehicle 1 the request signal for changing the viewpoint for the bird's-eye video of the vehicle 1, the processing flow shown in FIG. 12 ends. When the communication part 61 transmits to the vehicle 1 the request signal for changing the viewpoint for the bird's-eye video of the vehicle 1, the communication part 61 receives the data of the bird's-eye video generated based on the position data of the new viewpoint after changing. This allows a user to confirm the bird's-eye video of the vehicle 1 viewed from the new viewpoint after changing on the display 64 of the mobile terminal 2.

In the case of no request for the change of the viewpoint for the bird's-eye video of the vehicle 1 (No in the processing of step S03 in FIG. 12), the processing flow moves to step S05 in FIG. 12. In the processing of step S05 in FIG. 12, the controller 60 judges whether an automatic follow-up is selected. The automatic follow-up function causes the first-image-capturing part 11 or the second-image-capturing part 12 to point at the target approaching the vehicle 1. In an example, in the case where the user touches a button 80 including a word "automatic follow-up" displayed on the display 64 of the mobile terminal 2 shown in FIG. 13, the controller 60 judges that the automatic follow-up is selected. On the contrary, when the user does not touch the button 80 including the word "automatic follow-up" displayed on the display 64 of the mobile terminal 2 shown in FIG. 13, the controller 60 judges that the automatic follow-up is not selected.

In the case where the automatic follow-up is selected (Yes in the processing of step S05 in FIG. 12), the processing flow moves to step S06 in FIG. 12. In the processing of step S06 in FIG. 12, the controller 60 judges whether switching the camera 200 is requested. Switching the camera 200 is requested, for example by a user through the operation part 63. In an example, in the case where the user touches one of the marks 81 to 86 displayed on the display 64 of the mobile terminal 2 shown in FIG. 13, the controller 60 judges that switching the camera 200 is requested.

The marks 81 to 84 displayed on the display 64 of the mobile terminal 2 shown in FIG. 13 show respectively the front camera 30, the left-side camera 31, the right-side camera 32, and the rear camera 33 of the vehicle 1. In the case where the user touches the mark 81 displayed on the display 64 of the mobile terminal 2 shown in FIG. 13, the image captured by the front camera 30 of the vehicle 1 on the display 64 of the mobile terminal 2 is requested for display on the display 64 of the mobile terminal 2. Thus, switching the camera 200 corresponds to switching the image for display on the display 64 of the mobile terminal 2 shown in FIG. 13. The same is true for the marks 82 to 84 displayed on the display 64 of the mobile terminal 2 shown in FIG. 13.

The mark 85 and the mark 86 displayed on the display 64 of the mobile terminal 2 shown in FIG. 13 show respectively the in-vehicle camera 50 and the in-vehicle camera 51. In the case where the user touches the mark 85 displayed on the display 64 of the mobile terminal 2 shown in FIG. 13, the image captured by the in-vehicle camera 50 of the vehicle 1 is requested for display on the display 64 of the mobile terminal 2. The same is true for the mark 86 displayed on the display 64 of the mobile terminal 2 shown in FIG. 13.

Here is a description of the processing flow of FIG. 12 again. In the case where switching the camera 200 is requested (Yes in the processing of step S06 in FIG. 12), the processing flow moves to step S07 in FIG. 12. In the processing of step S07 in FIG. 12, the communication part 61 transmits to the vehicle 1 a signal indicating the automatic follow-up selected, a request signal for switching the camera 200 and a name of the new camera 200 after switching. The names of each camera 200 are stored in the memory 65 in advance.

When the communication part 61 transmits to the vehicle 1 the signal indicating the automatic follow-up selected, the request signal for switching the camera 200 and the name of the new camera 200 after switching, the processing flow shown in FIG. 12 ends. When the communication part 61 transmits to the vehicle 1 the signal indicating the automatic follow-up selected, the request signal for switching the camera 200 and the name of the new camera 200 after switching, the communication part 61 receives the video data of the image captured by the new camera 200 after switching.

In the case of no request for switching the camera 200 (No in the processing of step S06 in FIG. 12), the processing flow moves to step S08 in FIG. 12. In the processing of step S08 in FIG. 12, the communication part 61 transmits the signal indicating the automatic follow-up selected to the vehicle 1. When the communication part 61 transmits the signal indicating the automatic follow-up selected to the vehicle 1, the processing flow shown in FIG. 12 ends.

In the case where the automatic follow-up is not selected (No in the processing of step S05 in FIG. 12), the processing flow moves to step S09 in FIG. 12. In the processing of step S09 in FIG. 12, the controller 60 judges whether switching the camera 200 is requested. Switching the camera 200 is requested, for example, by a user through the operation part 63. In the case of no request for switching the camera 200 (No in the processing of step S09 in FIG. 12), the processing flow shown in FIG. 12 ends. In this case, since the automatic follow-up is not selected and switching the camera 200 is not requested, the display 64 of the mobile terminal 2 keeps displaying the bird's-eye video of the vehicle 1.

On the other hand, in the case where switching the camera 200 is requested (Yes in the processing of step S09 in FIG. 12), the processing flow moves to step S10 in FIG. 12. In the processing of step S10 in FIG. 12, the communication part 61 transmits to the vehicle 1 a signal indicating the auto follow-up not selected, the request signal for switching the camera 200 and the name of the new camera 200 after switching. When the communication part 61 transmits to the vehicle 1 the signal indicating the auto follow-up not selected, the request signal for switching the camera 200 and the name of the new camera 200 after switching, the processing flow in FIG. 12 ends.

So far, the cases for displaying the data of the bird's-eye video in FIG. 13 are described. However, the processing flow may be applied to the case for displaying the bird's-eye still image of FIG. 10 as well. In this case, the marks 82 to 86 are displayed on the bird's-eye still image, and the button 80 for the automatic follow-up is displayed on the display 64 of FIG. 10. Thus, the user can change the viewpoint or request the automatic follow-up on the displayed bird's-eye still image.

<Processing Flow for Switching Display from Vehicle 1 (Part 1)>

Figure 14:
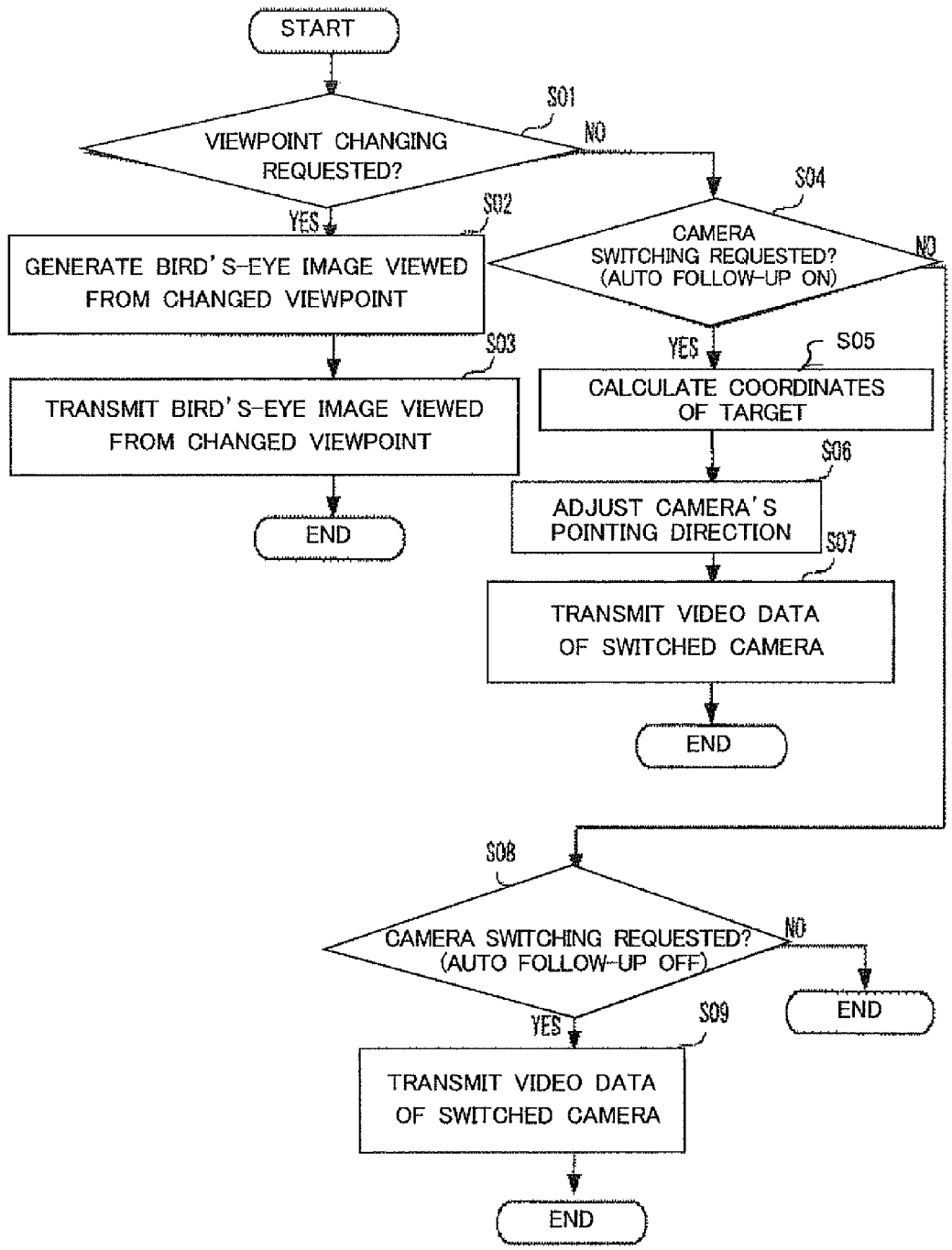
FIG. 14 shows a processing flow for switching display by use of in-vehicle apparatus.

FIG. 14 shows a processing flow for switching display by use of the in-vehicle apparatus 9. In the case where the processing flow shown in FIG. 7 ends after the data transceiver 18 sends to the mobile terminal 2 the e-mail attaching the data of the bird's-eye still image of the vehicle 1, the processing flow shown in FIG. 14 is started. Or in the case where the processing flow shown in FIG. 11 ends after the data transceiver 18 sends to the mobile terminal 2 the e-mail attaching the data of the bird's-eye video of the vehicle 1, the processing flow shown in FIG. 14 is started.

In the processing of step S01 in FIG. 14, the controller 10 judges whether the data transceiver 18 has received the request signal for changing the viewpoint for the bird's-eye image of the vehicle 1, and the new viewpoint data after changing. In the case where the data transceiver 18 has received the request signal for changing the viewpoint for the bird's-eye image of the vehicle 1 and the new viewpoint data after changing (Yes in the processing of step S01 in FIG. 14), the processing flow moves to step S02 in FIG. 14.

Figure 15:
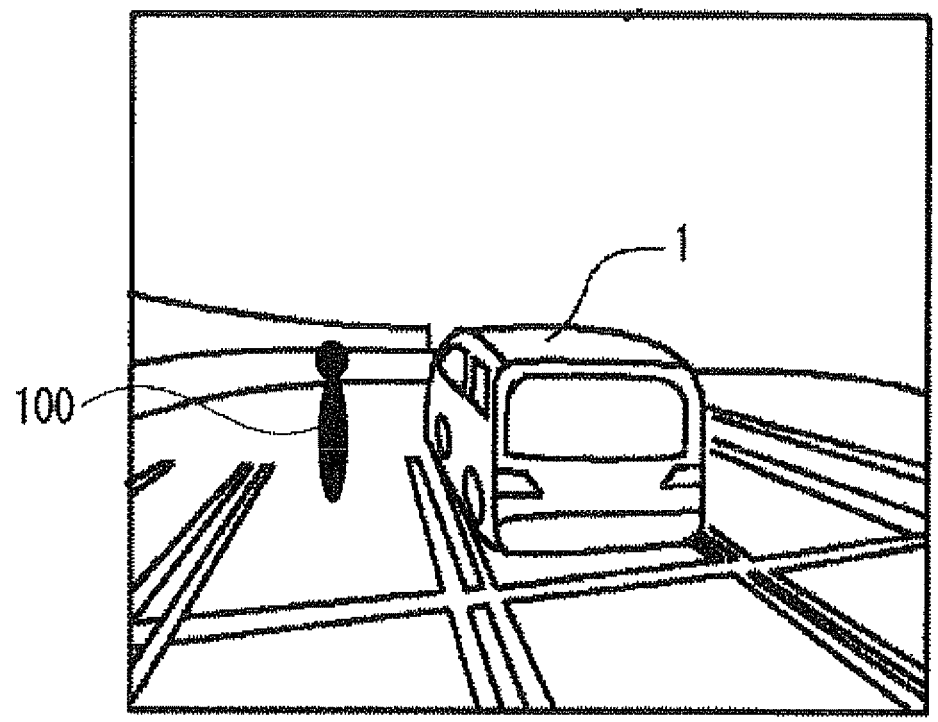
FIG. 15 shows another bird's-eye image of the vehicle.

In the processing of step S02 in FIG. 14, the image generator 13 generate a new bird's-eye image of the vehicle 1 viewed from the new viewpoint corresponding to the new viewpoint data after changing. That is, the image generator 13 generates a composite image showing the periphery of the vehicle 1 viewed from the new virtual viewpoint VP after changing based on the new viewpoint after changing. In this case, the image generator 13 generates the new bird's-eye image data of the vehicle 1. In an example, in the case where the new viewpoint data after changing corresponds to the position marked with the cross mark 90 on the bird's-eye image of the vehicle 1 displayed on the display 64 of the mobile terminal 2 shown in FIG. 13, the image generator 13 generates a bird's-eye image of the vehicle 1 shown in FIG. 15. At this time, in the case where the data transceiver 18 has received the request signal for changing the viewpoint for the data of the bird's-eye still image of the vehicle 1, the image generator 13 generates the data of the bird's-eye still image of the vehicle 1. On the other hand, in the case where the data transceiver 18 has received a request signal for changing the viewpoint for the data of the bird's-eye video of the vehicle 1, the image generator 13 generates the data of the bird's-eye video of the vehicle 1. The target 100 is displayed simplistically in FIG. 15 of the bird's-eye image of the vehicle 1. However, the target 100 in the bird's-eye image of the vehicle 1 is displayed clearly enough so that the user can judge whether the target 100 is a suspicious person. The bird's-eye image data of the vehicle 1 newly generated by the image generator 13 is stored in the memory 14.

In the processing of step S03 in FIG. 14, the data transceiver 18 transmits to the mobile terminal 2 the bird's-eye image data of the vehicle 1 viewed from the new viewpoint after changing. When the data transceiver 18 transmits the newly-generated bird's-eye image data of the vehicle 1, the processing flow shown in FIG. 14 ends.

On the other hand, in the case where the data transceiver 18 has received neither the request signal for changing the viewpoint for the bird's-eye image of the vehicle 1 nor the changed viewpoint position data (No in the processing of step S01 in FIG. 14), the processing flow moves to step S04 in FIG. 14. In the processing of step S04 in FIG. 14, the controller 10 judges whether the data transceiver 18 has received the signal indicating the automatic follow-up selected, the request signal for changing the camera 200 and the name of the new camera 200 after changing. In the case where the data transceiver 18 has received the signal indicating the automatic follow-up selected, the request signal for changing the camera 200 and the name of the new camera 200 after changing (Yes in the processing of step S04 in FIG. 14), the processing flow moves to step S05 in FIG. 14.

In the processing of step S05 in FIG. 14, the controller 10 obtains from the periphery monitor 17 the data including a distance from the vehicle 1 to the target, a velocity of the target and a direction (angle θ) to the target. Then, the controller 10 calculates coordinates of the target approaching the vehicle 1 based on the distance from the vehicle 1 to the target and the direction (angle θ) to the target.

In the processing of step S06 in FIG. 14, the controller 10 causes the new camera 200 after the switch to point at the target approaching the vehicle 1 by adjusting the direction of the new camera 200 after switching based on the calculated coordinates. In the processing of step S07 in FIG. 14, the data transceiver 18 transmits to the mobile terminal 2 the video data of the image captured by the new camera 200 after switching. When the data transceiver 18 transmits to the mobile terminal 2 the video data of the image captured by the new camera 200 after switching, the processing flow shown in FIG. 14 ends.

On the other hand, in the case where the data transceiver 18 receives none of the signal indicating the automatic follow-up selected, the request signal for switching the camera 200 and the name of the new camera 200 after switching (No in the processing of step S04 in FIG. 14), the processing flow moves to step S08 in FIG. 14.

In the processing of step S08 in FIG. 14, the controller 10 judges whether the data transceiver 18 has received the signal indicating the automatic follow-up not selected, the request signal for switching the camera 200 and the name of the new camera 200 after switching. In the case where the data transceiver 18 has received the signal indicating the automatic follow-up not selected, the request signal for switching the camera 200 and the name of the new camera 200 after switching (Yes in the processing of step S08 in FIG. 14), the processing flow moves to step S09 in FIG. 14.

In the processing of step S09 in FIG. 14, the data transceiver 18 transmits to the mobile terminal 2 the video data of the image captured by the new camera 200 after switching. When the data transceiver 18 transmits the video data of the image captured by the new camera 200 after switching to the mobile terminal 2, the processing flow shown in FIG. 14 ends.

On the other hand, in the case where the data transceiver 18 receives none of the signal indicating the automatic follow-up not selected, the request signal for switching the camera 200 and the name of the new camera 200 after switching (No in the processing of step S08 in FIG. 14), the processing flow shown in FIG. 14 ends.

<Processing Flow for Switching Display by Use of Mobile Terminal 2 (Part 2)>

Figure 16:
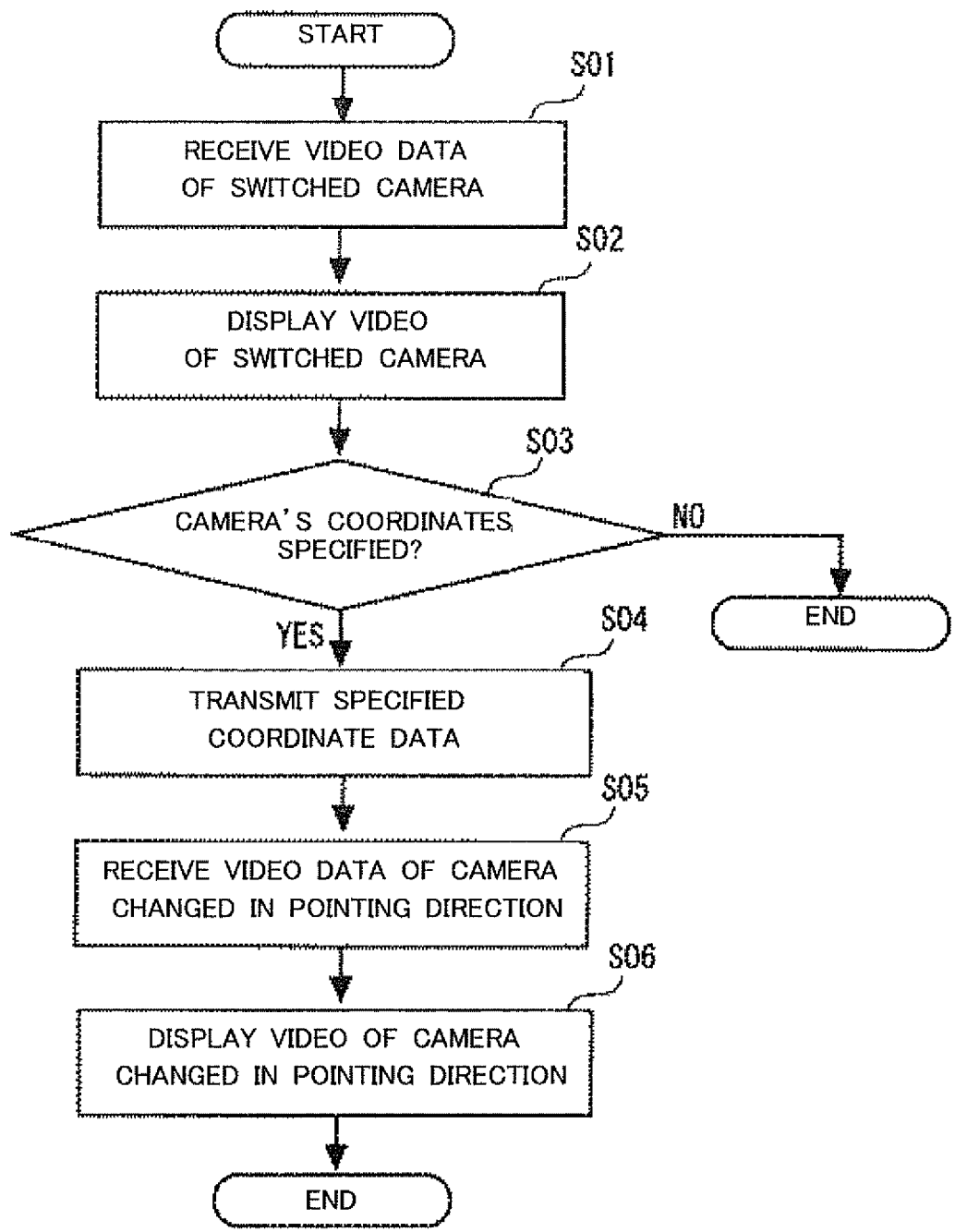
FIG. 16 shows a processing flow for providing an instruction to change an image-capturing direction of a camera by use of the mobile terminal.

The user can adjust the front camera 30, the left-side camera 31, the right-side camera 32 and the rear camera 33 of the first-image-capturing part 11 to the appropriate directions by providing instructions to the vehicle 1 from the mobile terminal 2. The user can also adjust the in-vehicle cameras 50 and 51 to the appropriate directions by providing instructions to the vehicle 1 from the mobile terminal 2. FIG. 16 shows a processing flow for providing an instruction to change an image-capturing direction of the camera 200 by use of the mobile terminal 2. In the case where the processing flow of FIG. 12 ends when the communication part 61 transmits to the vehicle 1 the signal indicating the automatic follow-up not selected, the request signal for switching the camera 200 and the name of the new camera after switching, the processing flow shown in FIG. 16 is started. That is, the processing flow shown in FIG. 16 is started when the processing of step S10 in FIG. 12 ends.

Figure 17:
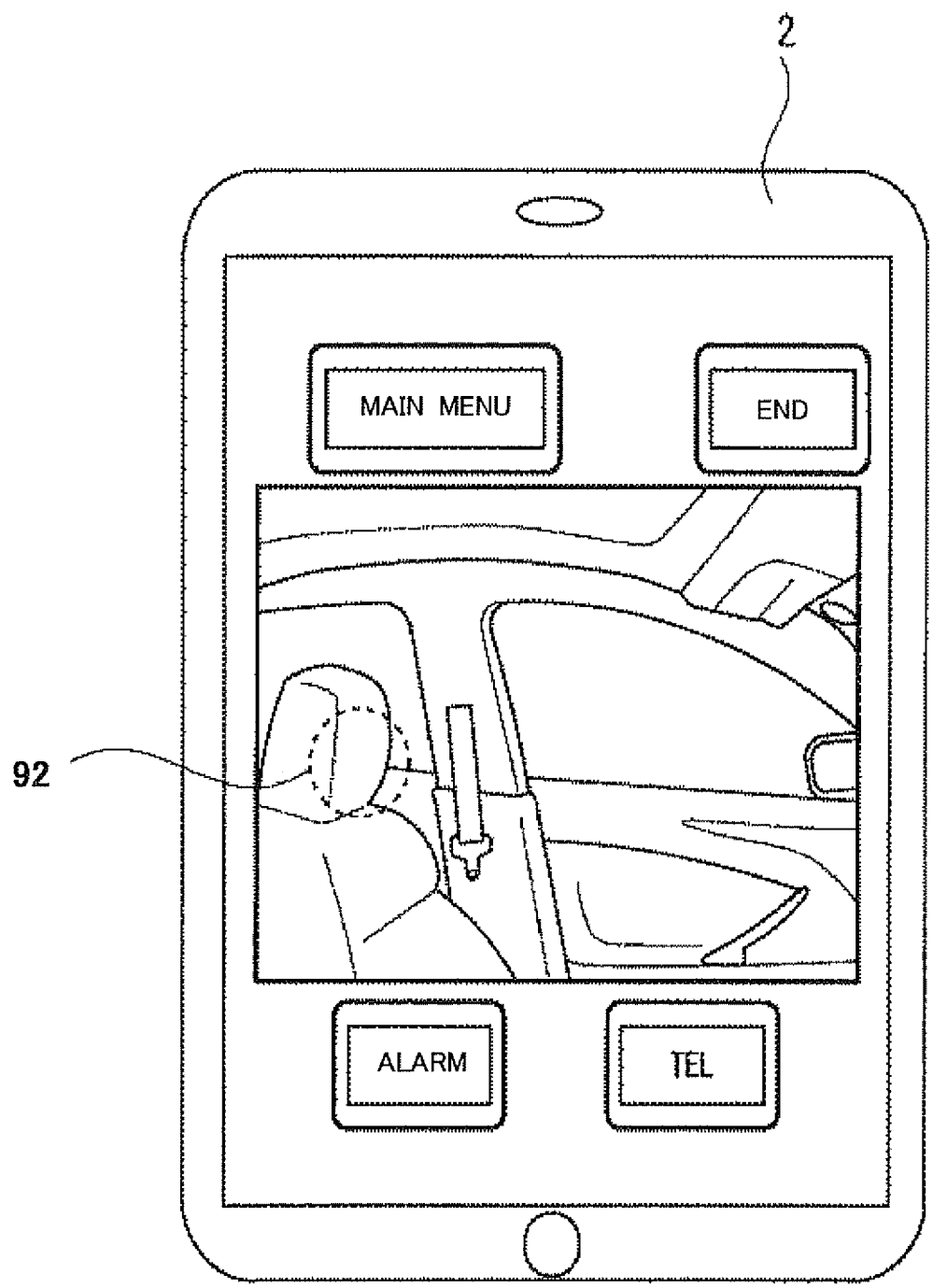
FIG. 17 shows another example of the video displayed on the display of the mobile terminal, which has been captured by a camera after switching.

In the processing of step S01 in FIG. 16, the communication part 61 receives from the vehicle 1 the video data of the image captured by the new camera 200 after switching. In the processing of step S02 in FIG. 16, the display 64 displays the video captured by the new camera 200 after switching. FIG. 17 shows another example of the video displayed on the display 64 of the mobile terminal 2, which has been captured by the new camera 200 after switching. The mobile terminal 2 shown in FIG. 17 adopts a touch panel as the operation part 63, which is formed integrally with the display area of the display 64. In FIG. 17, the in-vehicle camera 50 is used as the camera 200 after switching, and the video captured by the in-vehicle camera 50 is displayed on the display 64 of the mobile terminal 2.

In the processing of step S03 in FIG. 16, the controller 60 judges whether the coordinates of the camera 200 are specified. In an example, in the case where the user touches a position having a dotted circle marked with a mark 92 on the image displayed on the display 64 of the mobile terminal 2 shown in FIG. 17, the controller 60 judges that the coordinates of the camera 200 are specified.

Figure 18:
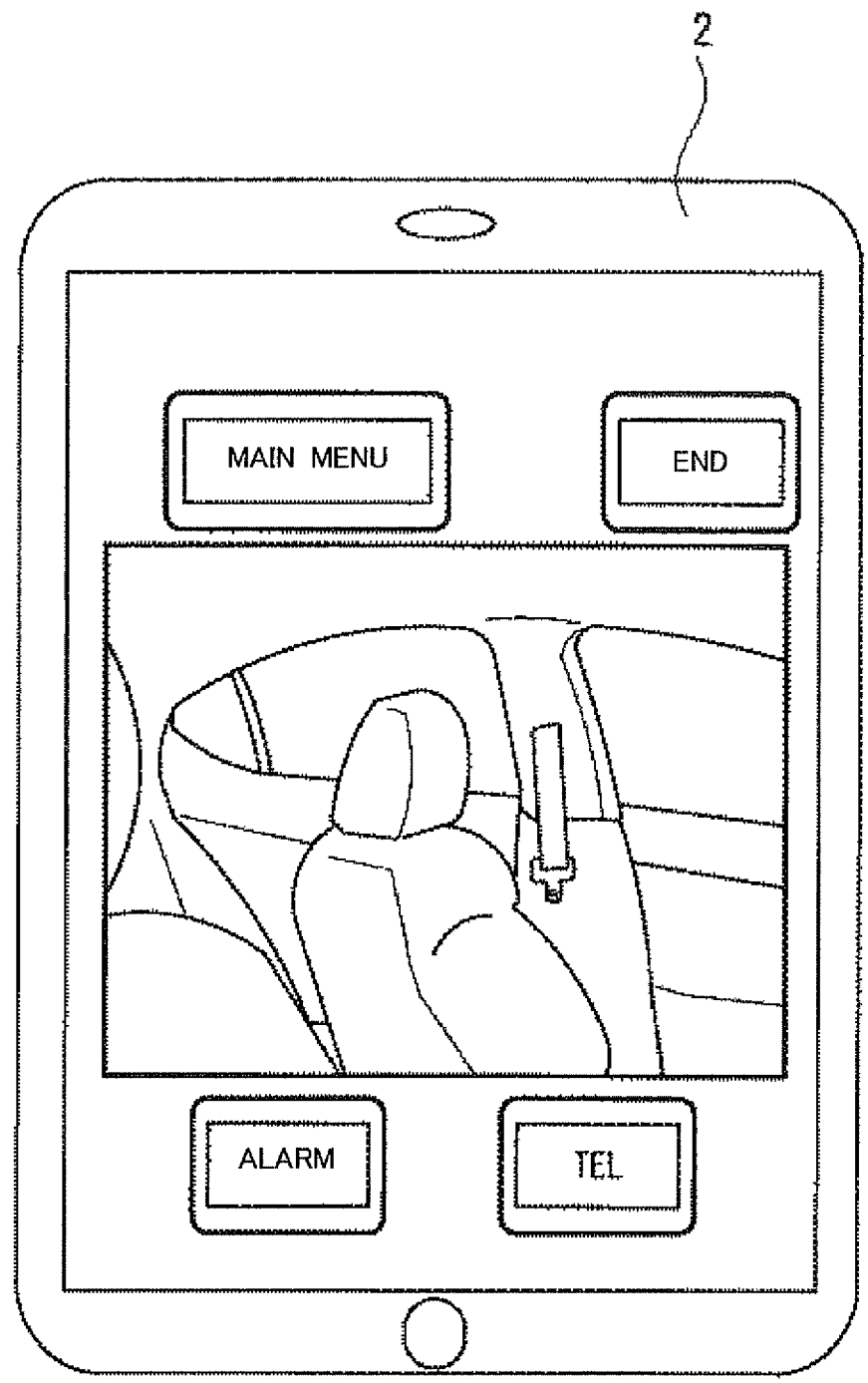
FIG. 18 shows another example of the video displayed on the display of the mobile terminal, which has been captured by a camera changed in its image-capturing direction.

In the case where the coordinates of the camera 200 are specified (Yes in the processing of step S03 in FIG. 16), the processing flow moves to step S04 in FIG. 16. In the processing of step S04 in FIG. 16, the communication part 61 transmits the specified coordinate data to the vehicle 1. In the processing of step S05 in FIG. 16, the communication part 61 receives from the vehicle 1 the video data captured by the camera 200 after changing in the image-capturing direction based on the specified coordinates of the camera 200. In the processing of step S06 in FIG. 16, the display 64 displays the video captured by the camera 200 after changing in the image-capturing direction. FIG. 18 shows another example of the video displayed on the display 64 of the mobile terminal 2, which has been captured by the camera 200 changed in its image-capturing direction.

Center position of the image displayed on the display 64 of the mobile terminal 2 shown in FIG. 18 corresponds to the position of dotted circle indicated as the mark 92 on the image of FIG. 17 displayed on the display 64 of the mobile terminal 2. As above, the user can change the image-capturing direction of the camera 200 arbitrarily by touching the video displayed on the display 64 of the mobile terminal 2. When the video captured by the camera 200 after changing in the image-capturing direction is displayed, the processing flow shown in FIG. 16 ends.

On the other hand, the coordinates of the camera 200 are not specified (No in the processing of step S03 in FIG. 16), the processing flow shown in FIG. 16 ends. In this case, since the coordinates of the camera 200 are not specified, the display 64 keeps displaying the captured video as is with no change in the image-capturing direction of the camera 200.

<Processing Flow for Changing Display from Vehicle 1 (Part 2)>

Figure 19:
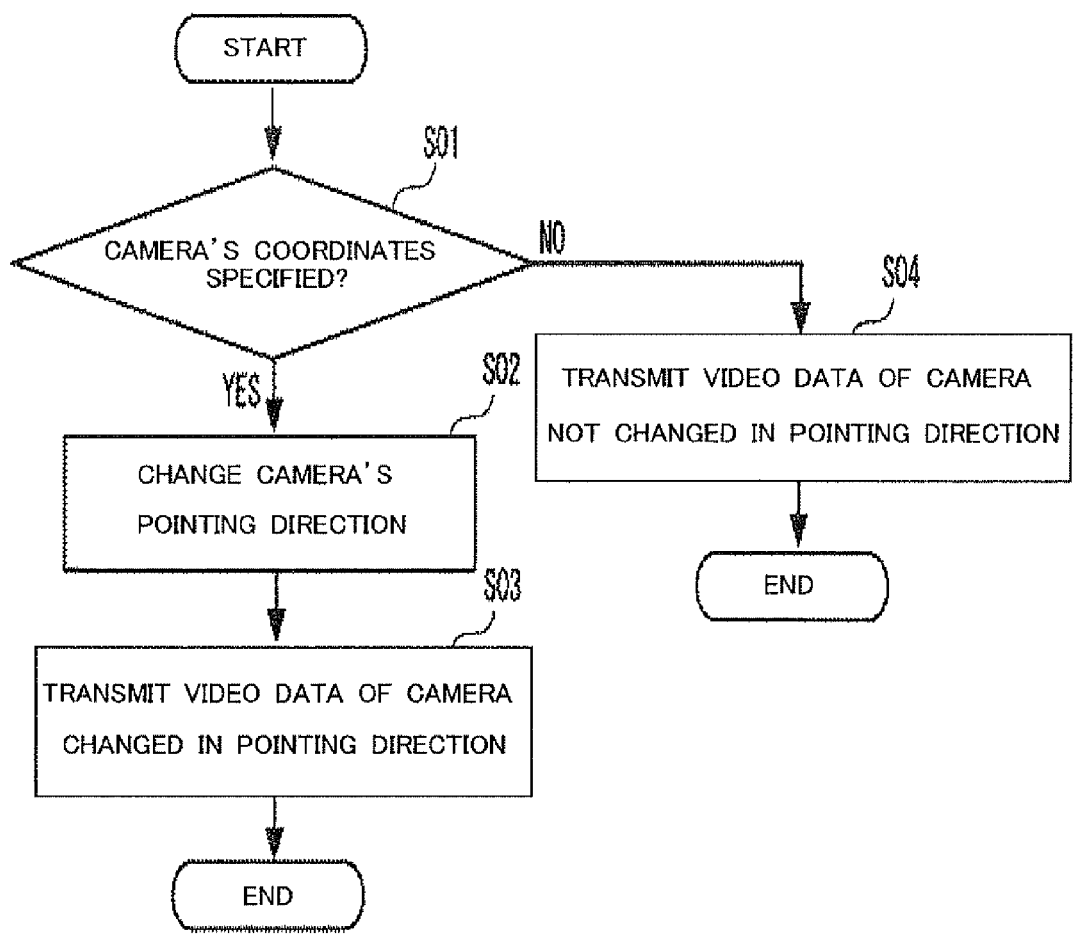
FIG. 19 shows a processing flow for changing display by use of the in-vehicle apparatus.

FIG. 19 shows a processing flow for changing display by use of the in-vehicle apparatus 9. The processing flow shown in FIG. 19 is started after step S09 in FIG. 14 ends. In the processing of step S01 in FIG. 19, the controller 10 judges whether the data transceiver 18 has received the coordinate data specified by the mobile terminal 2. That is, the controller 10 judges whether the coordinates of the camera 200 are specified.

In the case where the coordinates of the camera 200 are specified (Yes in the processing of step S01 in FIG. 19), the processing flow moves to step S02 in FIG. 19. In the processing of step S02 in FIG. 19, the controller 10 changes the image-capturing directions of the front camera 30, the left-side camera 31, the right-side camera 32 and the rear camera 33, based on the received coordinate data. Or the controller 10 changes the image-capturing directions of the in-vehicle cameras 50 and 51 based on the received coordinate data.

In the processing of step S03 in FIG. 19, the data transceiver 18 transmits to the mobile terminal 2 the video data captured by the camera 200 changed in its image-capturing direction. When the data transceiver 18 transmits the video data captured by the camera changed in its image-capturing direction, the processing flow shown in FIG. 19 ends.

On the other hand, in the case where the coordinates of the camera 200 are not specified (No in the processing of step S01 in FIG. 19), the processing flow moves to step S04 in FIG. 19. In the processing of step S04 in FIG. 19, the data transceiver 18 transmits to the mobile terminal 2 the video data captured by the camera 200 with no change in the image-capturing direction. When the data transceiver 18 transmits to the mobile terminal 2 the video data captured by the camera 200 with no change in the image-capturing direction, the processing flow shown in FIG. 19 ends.

<Processing Flow for Preventing Battery Running Out of Vehicle 1>

Figure 20:
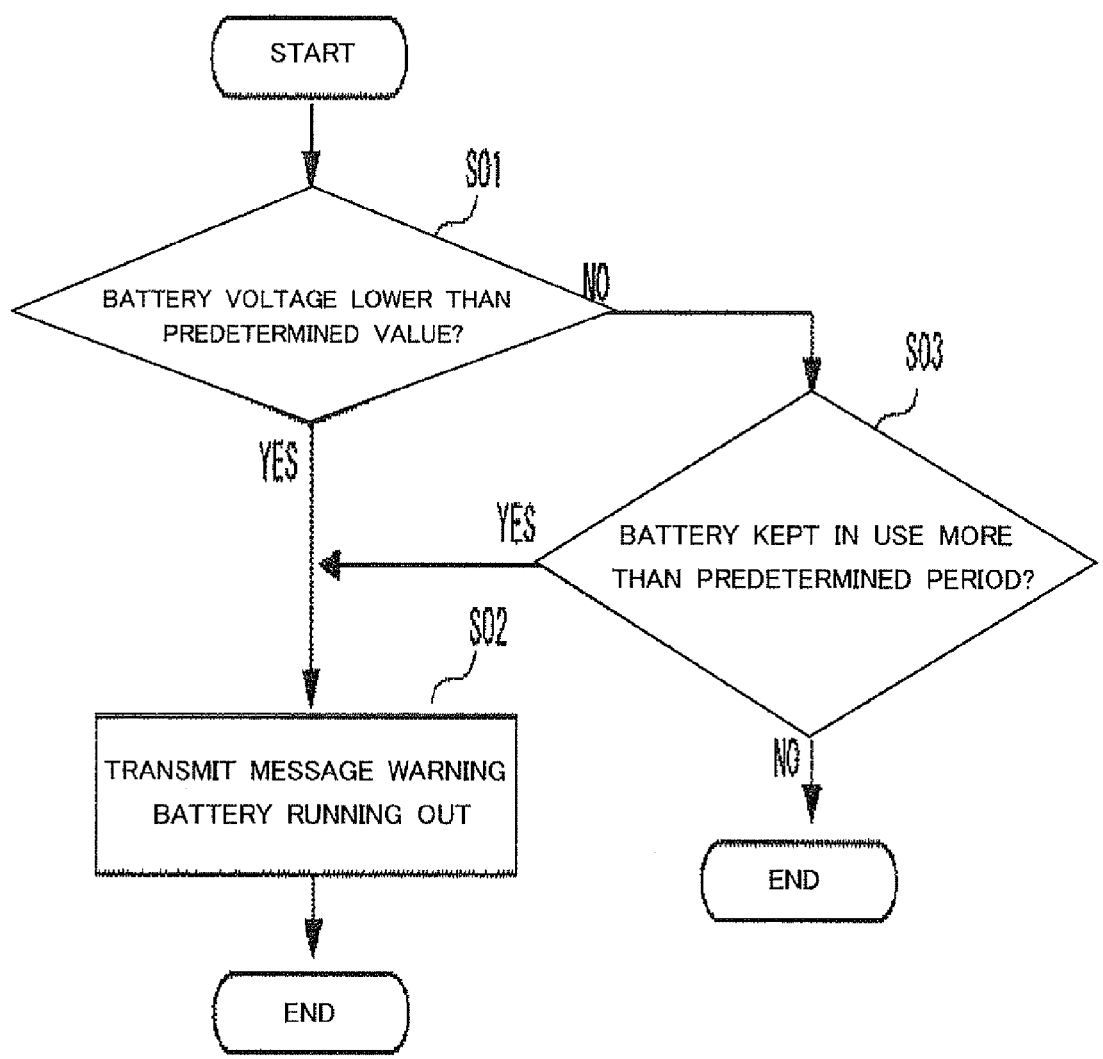
FIG. 20 shows a processing flow for implementation on the in-vehicle apparatus.
Figure 21:
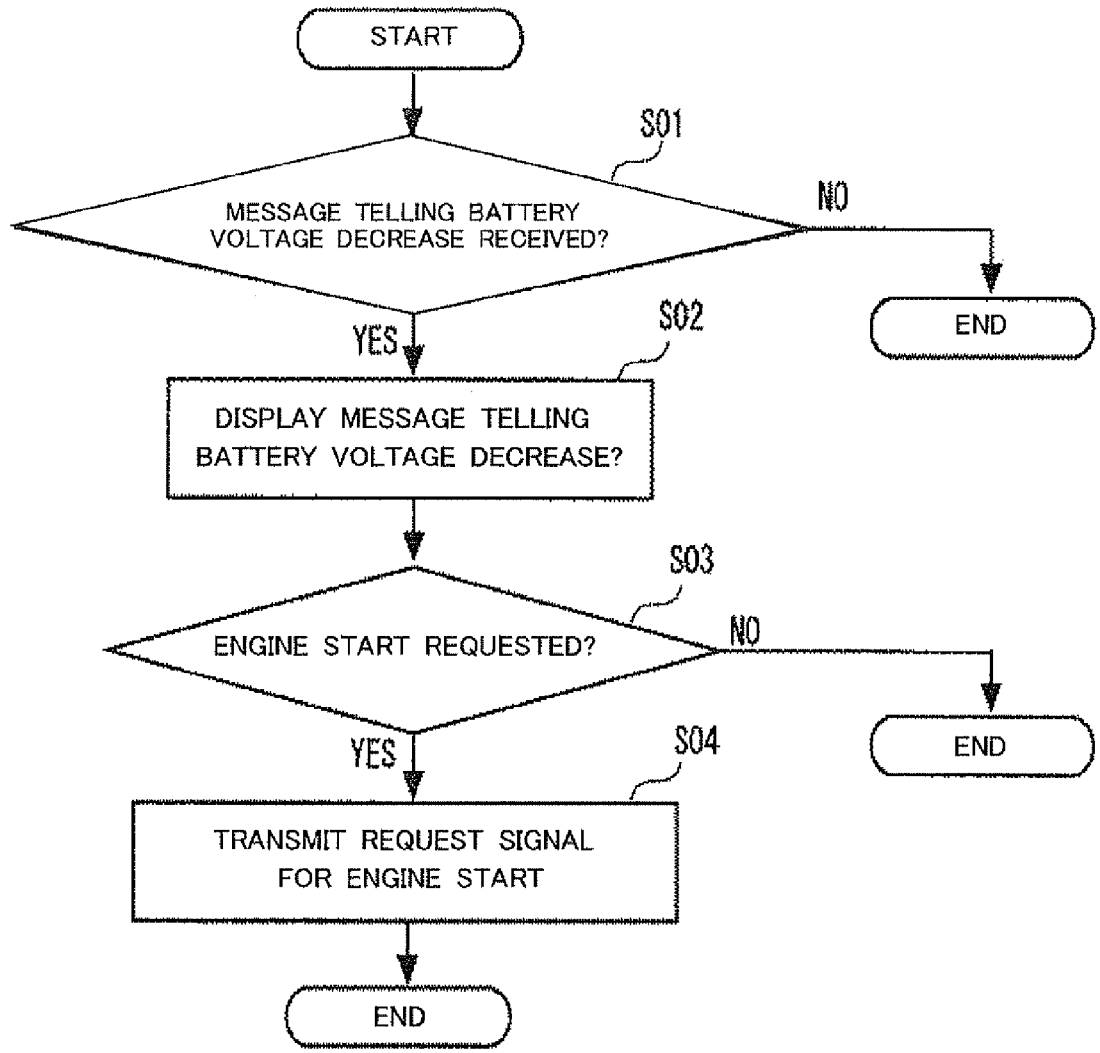
FIG. 21 shows a processing flow for implementation on the mobile terminal.
Figure 23:
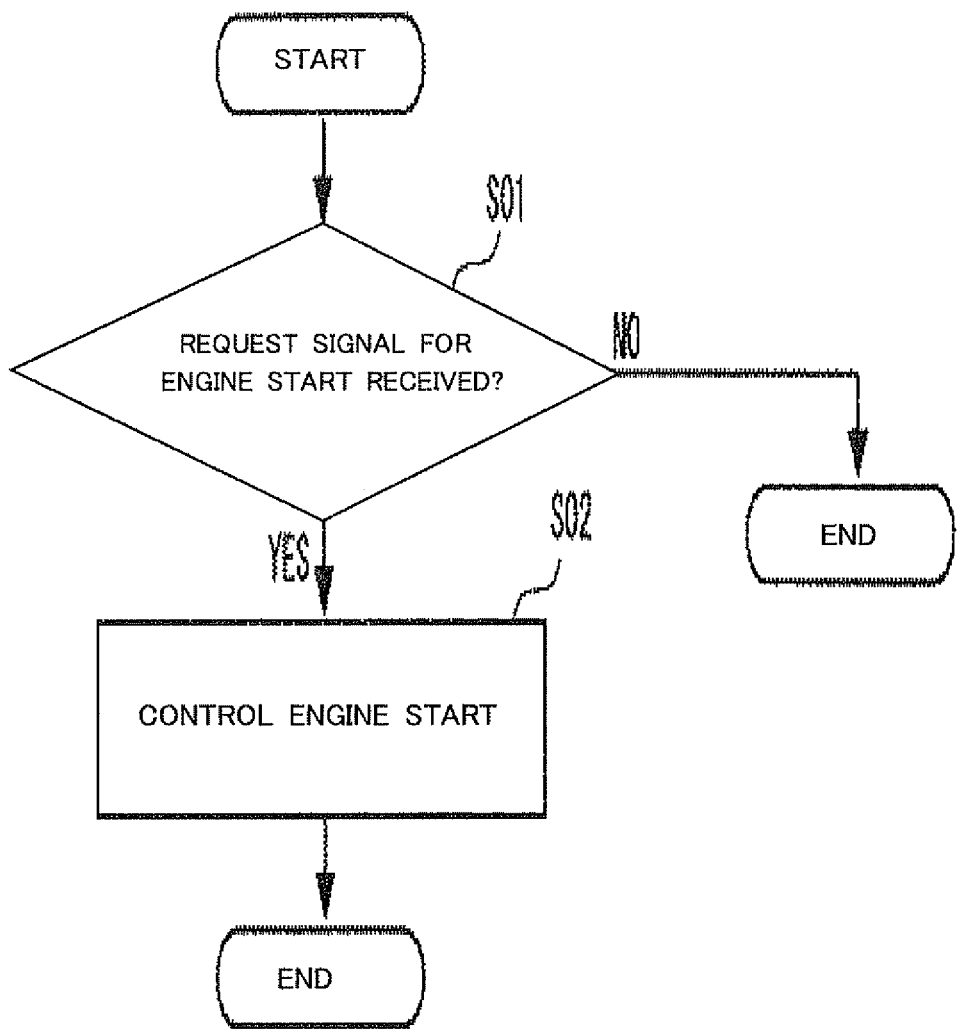
FIG. 23 shows another processing flow for implementation on the in-vehicle apparatus.

FIG. 20, FIG. 21, and FIG. 23 show respectively processing flows for preventing battery running out of the vehicle 1. FIG. 20 and FIG. 23 show the processing flows for implementation on the in-vehicle apparatus 9. FIG. 21 shows the processing flow for implementation on the mobile terminal 2. The processing flows shown in FIG. 20, FIG. 21 and FIG. 23 may be implemented repeatedly.

First, FIG. 20 will be described. The processing flow shown in FIG. 20 is started at the predetermined time. The processing flow shown in FIG. 20 may be started, for example, at the predetermined time according to a clock (not shown in figures) included in the vehicle 1.

In the processing of step S01 in FIG. 20, the controller 10 judges whether the voltage of the battery (not shown in figures) included in the vehicle 1 is lower than a predetermined value. In the case where the voltage of the battery included in the vehicle 1 is lower than the predetermined value (Yes in the processing of step S01 in FIG. 20), the processing flow moves to step S02 in FIG. 20. In the processing of step S02 in FIG. 20, the data transceiver 18 transmits to the mobile terminal 2 a message telling voltage decrease of the battery included in the vehicle 1. The data transceiver 18 may send an e-mail including the message telling voltage decrease of the battery included in the vehicle 1. When the data transceiver 18 transmits to the mobile terminal 2 the message telling voltage decrease of the battery included in the vehicle 1, the processing flow shown in FIG. 20 ends.

On the other hand, the voltage of the battery included in the vehicle 1 is not lower than the predetermined value (No in the processing of step S01 in FIG. 20), the processing flow moves to step S03 in FIG. 20. In the processing of step S03 in FIG. 20, the controller 10 judges whether the battery included in the vehicle 1 is kept in use for more than the predetermined period. The predetermined period is set as, for example, 10 minutes, but it is not limited to this value and other values may be set. In the case where the battery included in the vehicle 1 is kept in use for more than a predetermined period (Yes in the processing of step S03 in FIG. 20), the processing flow moves to step S02. On the other hand, the battery is not kept in use for more than the predetermined period (No in the processing of step S03 in FIG. 20), the processing flow shown in FIG. 20 ends.

The processing flow shown in FIG. 21 will be described. The processing flow shown in FIG. 21 responds to the processing flow shown in FIG. 20. In the processing of step S01 shown in FIG. 21, the controller 60 judges whether the communication part 61 has received the message that is transmitted by the processing of step S02 in FIG. 20 and tells voltage decrease of the battery included in the vehicle 1. The controller 60 may judge whether the communication part 61 has received the e-mail including the message telling voltage decrease of the battery included in the vehicle 1. In the case where the communication part 61 has not received the message telling voltage decrease of the battery included in the vehicle 1 (No in the processing of step S01 shown in FIG. 21), the processing flow shown in FIG. 21 ends. On the other hand, the communication part 61 has received the message telling voltage decrease of the battery included in the vehicle 1 (Yes in the processing of step S01 shown in FIG. 21), the processing flow moves to step S02 in FIG. 21.

Figure 22:
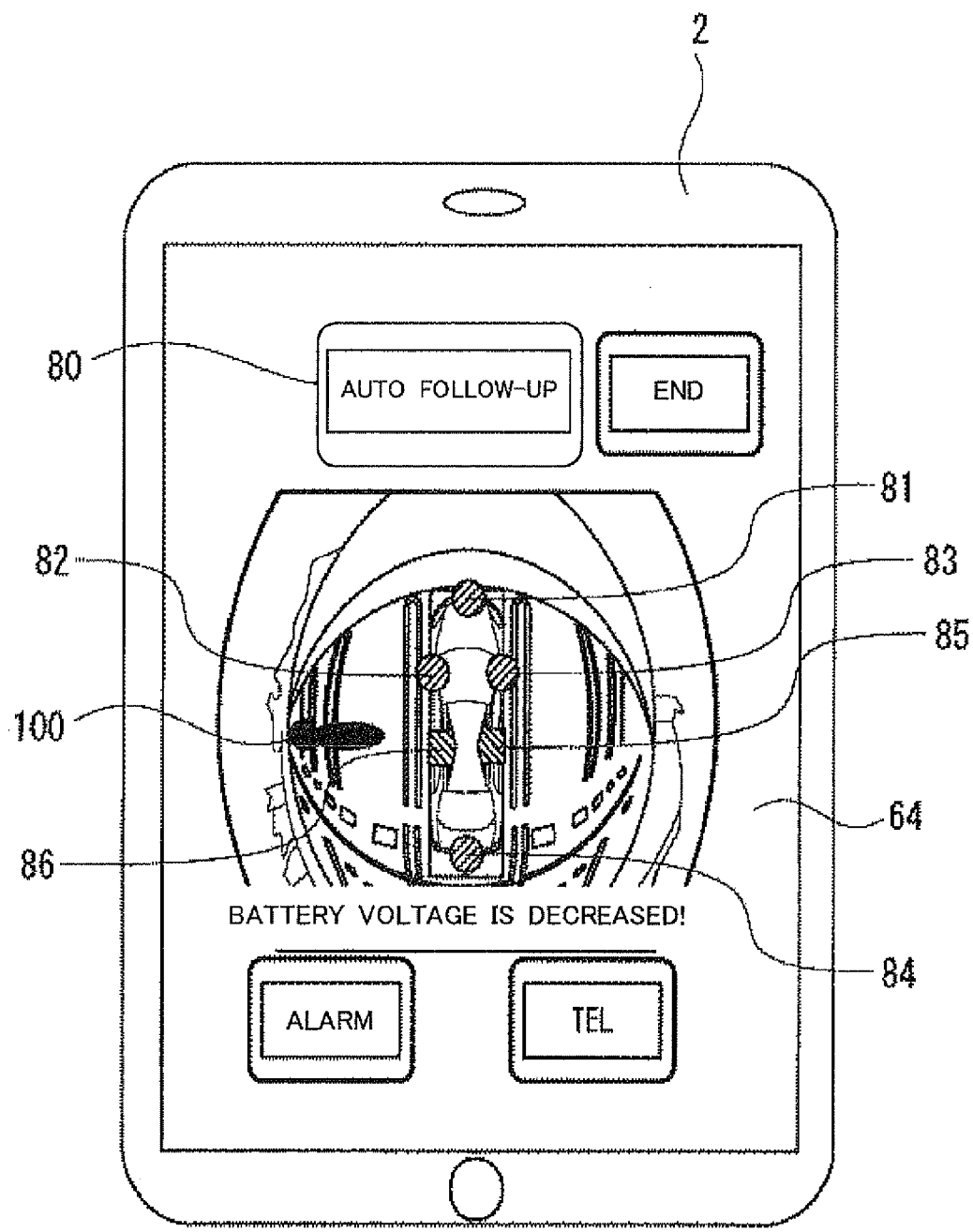
FIG. 22 shows an example of a massage displayed on the display of the mobile terminal, which tells voltage decrease of the battery of the vehicle.

In the processing of step S02 in FIG. 21, the display 64 displays the message telling voltage decrease of the battery included in the vehicle 1. FIG. 22 shows an example of display of the message telling voltage decrease of the battery included in the vehicle 1 on the display 64 of the mobile terminal 2. The target 100 is displayed simplistically in FIG. 22 of the bird's-eye image of the vehicle 1. However, the target 100 in the bird's-eye image of the vehicle 1 is actually displayed clearly enough so that the user can judge whether the target 100 is a suspicious person.

In the processing of step S03 in FIG. 21, the controller 60 judges whether the start of an engine (not shown in figures) included in the vehicle 1 is requested. Engine starting is requested, for example, by a user through the operation part 63. In the case of no request for engine starting (No in the processing of step S03 in FIG. 21), the processing flow shown in FIG. 21 ends. On the other hand, in the case where engine starting is requested (Yes in the processing of step S03 in FIG. 21), the processing flow moves to step S04 in FIG. 21. In the processing of step S04 in FIG. 21, the communication part 61 transmits the request signal for engine starting to the vehicle 1. When the communication part 61 transmits the request signal for engine starting to the vehicle 1, the processing flow shown in FIG. 21 ends.

The processing flow shown in FIG. 23 will be described. The processing flow shown in FIG. 23 responds to the processing flow shown in FIG. 21. In the processing of step S01 shown in FIG. 23, the controller 10 judges whether the data transceiver 18 has received the request signal for engine starting from the mobile terminal 2. In the case where the data transceiver 18 has received no request signal for engine starting from the mobile terminal 2 (No in the processing of step S01 shown in FIG. 23), the processing flow shown in FIG. 23 ends. On the other hand, in the case where the data transceiver 18 has received the request signal for engine starting from the mobile terminal 2 (Yes in the processing of step S01 shown in FIG. 23), the processing flow moves to step S02 shown in FIG. 23. In the processing of step S02 shown in FIG. 23, the engine controller 20 controls engine starting on the vehicle 1.

<Processing Flow for Alarm Control>

Figure 24:
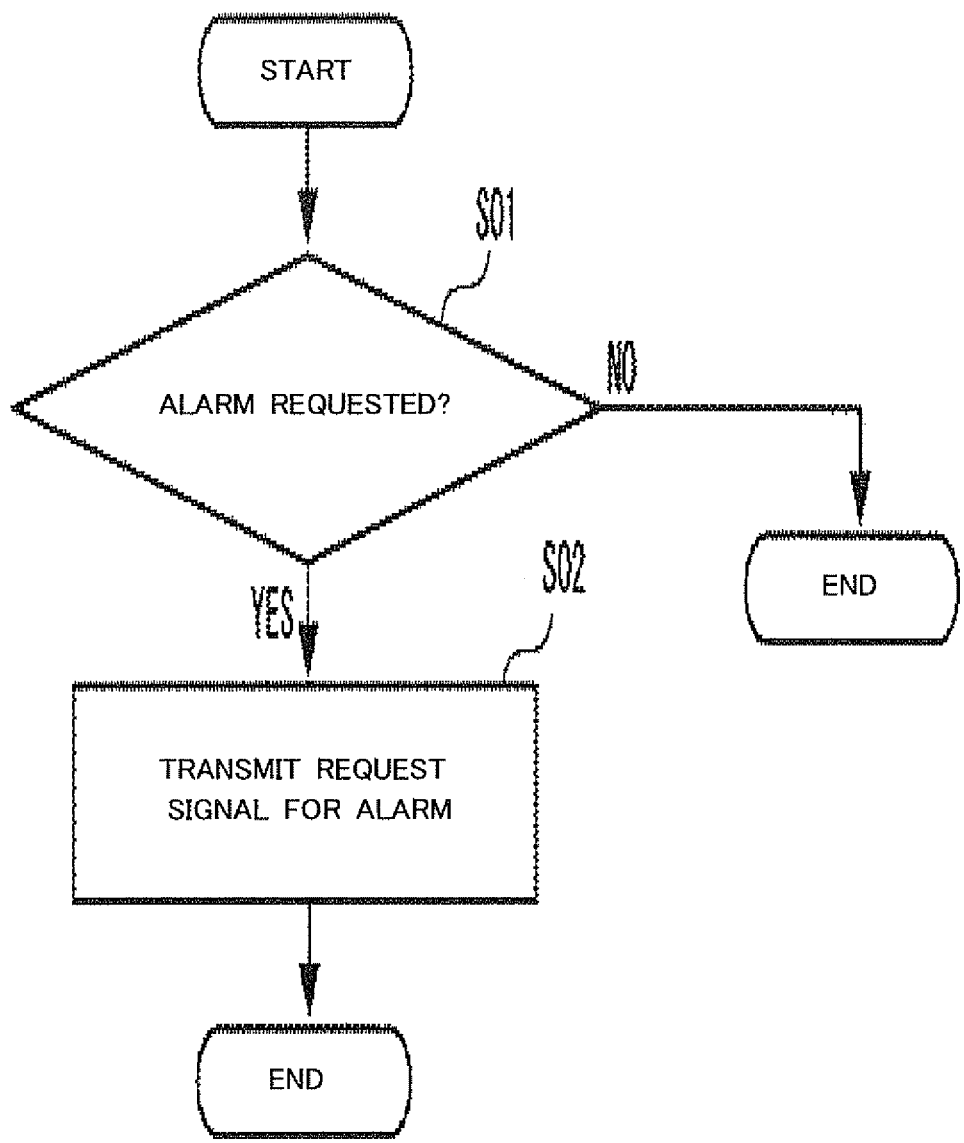
FIG. 24 shows a processing flow for alarm control.
Figure 25:
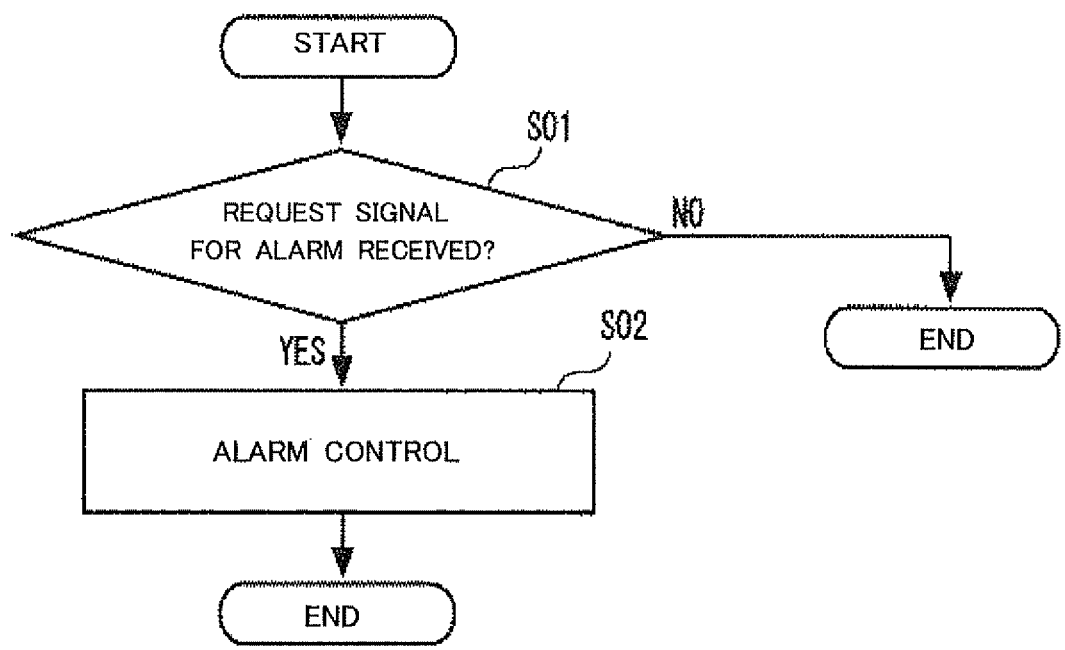
FIG. 25 shows another processing flow for alarm control.

FIG. 24 and FIG. 25 show processing flows for alarm control. FIG. 24 shows the processing flow for implementation on the mobile terminal 2, and FIG. 25 shows the processing flow for implementation on the vehicle 1. The processing flows shown in FIG. 24 and FIG. 25 may be implemented repeatedly.

First, the processing flow shown in FIG. 24 will be described. In the processing of step S01 in FIG. 24, the controller 60 judges whether an alarm is requested. The alarm is requested, for example, by a user through the operation part 63. In the case where the alarm is requested (Yes in the processing of step S01 in FIG. 24), the processing flow moves to step S02 in FIG. 24. On the other hand in the case of no request for the alarm (No in the processing of step S01 in FIG. 24), the processing flow shown in FIG. 24 ends. In the processing of step S02 in FIG. 24, the communication part 61 transmits a request signal for the alarm. When the communication part 61 transmits the request signal for the alarm, the processing flow shown in FIG. 24 ends.

The processing flow shown in FIG. 25 will be described. The processing flow shown in FIG. 25 is started after the processing flow shown in FIG. 24 ends. In the processing of step S01 in FIG. 25, the controller 10 judges whether the data transceiver 18 has received the request signal for the alarm. In the case where the data transceiver 18 has received the request signal for the alarm (Yes in the processing of step S01 in FIG. 25), the processing flow moves to step S02 in FIG. 25. On the other hand, in the case where the data transceiver 18 has received no request signal for the alarm (No in the processing of step S01 in FIG. 25), the processing flow shown in FIG. 25 ends. In the processing of step S02 in FIG. 25, the controller 10 controls the alarm 19. Controlling the alarm 19 provides implementation of one or more of the following examples: lighting of headlights, blinking of hazard lamp, sound output of a horn or a siren, and audio output by audio output apparatus. When the controller 10 controls the alarm 19, the processing flow shown in FIG. 25 ends.

In the embodiment described so far, image-capturing is started when a target approaching own vehicle is detected. By using a sensor for detecting other stealing, such as a vibration sensor (not shown in figures) for sensing vibrations applied to the vehicle 1, image-capturing may also be started when the sensor detects stealing.

The invention may relate to a method for a computer, other apparatus or a machine to implement one of the above processing.

The invention may also relate to a program for providing one of the above functions to a computer, other apparatus or a machine.

The invention may also relate to such a program stored in a non-transitory computer-readable recording medium.

<Operation and Effect in Embodiment>

A user can judge whether a target shown in a bird's-eye still image of the vehicle 1 is a suspicious person by watching the bird's-eye still image of the vehicle 1 displayed on the display 64 of the mobile terminal 2. In the case where the target shown in the bird's-eye still image of the vehicle 1 is a suspicious person, the user can give an alarm against the suspicious person based on the processing flows shown in FIG. 24 and FIG. 25. As above, the image display system 300 allows a user to judge whether the target approaching the vehicle 1 is a suspicious person by use of the bird's-eye still image of the vehicle 1. This prevents giving a wrong alarm against a non-suspicious person.

In some cases, the user hardly judges whether the target shown in the bird's-eye still image of the vehicle 1 is a suspicious person only by watching the bird's-eye still image of the vehicle 1 displayed on the display 64 of the mobile terminal 2. Or the user may want to closely watch the target shown in the bird's-eye still image of the vehicle 1. In such cases, the user can cause the display 64 of the mobile terminal 2 to display the bird's-eye video of the vehicle 1 by requesting transmission of the bird's-eye video of the vehicle 1. Then, the user can further judge whether the target shown in the bird's-eye video of the vehicle 1 is a suspicious person by watching the bird's-eye video of the vehicle 1 displayed on the display 64 of the mobile terminal 2. The user can also confirm in real time the target approaching the vehicle 1 and the periphery state of the vehicle 1 by watching the bird's-eye video of the vehicle 1 displayed on the display 64 of the mobile terminal 2.

When the viewpoint of the bird's-eye image of the vehicle 1 displayed on the display 64 of the mobile terminal 2 is changed, the bird's-eye image of the vehicle 1 viewed from the new viewpoint after changing is displayed on the display 64 of the mobile terminal 2. By changing the viewpoint of the bird's-eye image of the vehicle 1 displayed on the display 64 of the mobile terminal 2, the user can confirm the bird's-eye image of the vehicle 1 viewed form the new viewpoint after changing. The user can confirm the periphery state of the vehicle 1 more precisely on the bird's-eye image of the vehicle 1 viewed from an arbitrary viewpoint. Thus, the user can judge more precisely whether the target shown in the bird's-eye image of the vehicle 1 is a suspicious person.

When the user touches the bird's-eye image of the vehicle 1 displayed on the display 64 of the mobile terminal 2, the image displayed on the display 64 of the mobile terminal 2 is switched. In an example, the image captured by the front camera 30 of the vehicle 1 may be displayed on the display 64 of the mobile terminal 2, instead of the bird's-eye image of the vehicle 1. In another example, the image captured by the in-vehicle camera 50 of the vehicle 1 may be displayed on the display 64 of the mobile terminal 2, instead of the bird's-eye image of the vehicle 1. That is, the image captured by the front camera 30, the left-side camera 31, the right-side camera 32, the rear camera 33, the in-vehicle camera 50 or the in-vehicle camera 51 can be displayed on the display 64 of the mobile terminal 2, by switching the image from the bird's-eye image of the vehicle 1. This allows a user to watch a required video by selection. Thus, the user can confirm the periphery state of the vehicle 1 more precisely. As a result, the user can judge more precisely whether the target shown in the bird's-eye image of the vehicle 1 is a suspicious person.

The user can cause the first-image-capturing part 11 and/or the second-image-capturing part 12 to point straightly at the target approaching the vehicle 1 by operating the mobile terminal 2 to select the automatic follow-up. That is, since the automatic follow-up causes the camera 200 to point at the target approaching the vehicle 1, the user can watch the video centered on the target approaching the vehicle 1. The user can confirm the target approaching the vehicle 1 more precisely by watching the video centered on the target approaching the vehicle 1. As a result, the user can judge more precisely whether the target approaching the vehicle 1 is a suspicious person.

The embodiment can inform a user of voltage decrease of the battery of the vehicle 1 when the battery voltage of the vehicle 1 is decreased. As a result, the user can judge whether the user should request engine starting of the vehicle 1. Transmitting a request signal for engine starting from the mobile terminal 2 to the vehicle 1 can prevent battery running out on the vehicle 1.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle apparatus that is installed in a vehicle and that wirelessly communicates with a mobile terminal, the in-vehicle apparatus comprising:
    an image-capturing part that is installed on the vehicle and captures an image of a periphery of the vehicle;
    an image generator that generates a first bird's-eye image including the vehicle and the periphery of the vehicle viewed from a first virtual viewpoint based on the image captured by the image-capturing part;
    a transmitter that wirelessly transmits the bird's-eye image to the mobile terminal; and
    a detector that detects a target approaching the vehicle, wherein:
        based on a change request received from the mobile terminal, the image generator changes the first virtual viewpoint to a second virtual viewpoint and generates a second bird's-eye image viewed from the second virtual viewpoint after changing from the first virtual viewpoint to the second virtual viewpoint,
        when a signal indicating that an automatic follow-up is selected is received from the mobile terminal, the image-capturing part initiates an automatic follow-up that is free from user input, the automatic follow-up causes the image-capturing part to point at the target approaching the vehicle, and
        the transmitter sends the first bird's-eye image from the first virtual viewpoint and sends the second bird's eye-image from the second virtual viewpoint based on the received change request, and sends a video when the signal indicating that the automatic follow-up is selected is received from the mobile terminal.

2. The in-vehicle apparatus of claim 1, further comprising: a sensor that detects a target in the periphery of the vehicle, wherein the image generator starts generating the first bird's-eye image when the sensor has detected the target in the periphery of the vehicle.

3. The in-vehicle apparatus of claim 1, wherein the transmitter transmits the image captured by the image-capturing part based on a transmit request from the mobile terminal.

4. The in-vehicle apparatus of claim 1, further comprising: a second-image-capturing part that is installed in the vehicle and captures an image including a part of a vehicle cabin of the vehicle and a part of the periphery of the vehicle, wherein the transmitter transmits the image captured by the second-image-capturing part to the mobile terminal based on a transmit request from the mobile terminal.

5. The in-vehicle apparatus of claim 1, wherein the image generator starts generating the first bird's-eye image when a target in the periphery of the vehicle is approaching the vehicle.

6. The in-vehicle apparatus of claim 1, wherein the mobile terminal is a terminal that is carried by a user of the vehicle and is located externally of the vehicle.

7. An image providing method for wirelessly communicating an image from a vehicle to a mobile terminal, the method comprising the steps of:
    (a) capturing an image of a periphery of the vehicle from the vehicle;
    (b) generating a first bird's-eye image including the vehicle and the periphery of the vehicle viewed from a first virtual viewpoint based on the captured image of the periphery of the vehicle;
    (c) wirelessly transmitting the generated first bird's-eye image to the mobile terminal;
    (d) detecting a target approaching the vehicle, wherein the method further comprises the steps of:
        based on a change request from the mobile terminal, changing the first virtual viewpoint to a second virtual viewpoint and generating a second bird's-eye image viewed from the second virtual viewpoint after changing from the first virtual viewpoint to the second virtual viewpoint, and
        when a signal indicating that an automatic follow-up is selected is received from the mobile terminal, initiating an automatic follow-up that is free from user input, the automatic follow-up causes the image-capturing part to point at the target approaching the vehicle, and
    (e) sending the first bird's-eye image from the first virtual viewpoint and sending the second bird's eye-image from the second virtual viewpoint based on the received change request, and then sending a video when the signal indicating that the automatic follow-up is selected is received from the mobile terminal.

8. The image providing method of claim 7, further comprising the step of detecting a target in the periphery of the vehicle, wherein the generation step includes starting generation of the first bird's-eye image when the target has been detected in the periphery of the vehicle.

9. The image providing method of claim 7, wherein the wireless transmission step includes transmitting the captured image of the periphery of the vehicle based on a transmit request received from the mobile terminal.

10. The image providing method of claim 7, further comprising the step of capturing another image including a part of a vehicle cabin of the vehicle and a part of the periphery of the vehicle, wherein the wireless transmission step includes transmitting the captured another image including the part of the vehicle cabin to the mobile terminal based on a transmit request received from the mobile terminal.

11. The image providing method of claim 7, wherein the generation of the first bird's-eye image includes generating the first bird's-eye image when a target in the periphery of the vehicle is approaching the vehicle.

12. The image providing method of claim 7, wherein the mobile terminal is a terminal that is carried by a user of the vehicle and is located externally of the vehicle.

13. A non-transitory computer-readable recording medium configured to store a program executable by a computer included in an in-vehicle apparatus that is installed in a vehicle, the in-vehicle apparatus being configured to wirelessly communicate with a mobile terminal, the program including instructions, that when executed by the computer, perform steps of:
  (a) capturing an image of a periphery of the vehicle from the vehicle;
  (b) generating a first bird's-eye image including the vehicle and the periphery of the vehicle viewed from a first virtual viewpoint based on the captured image of the periphery of the vehicle;
  (c) wirelessly transmitting the generated first bird's-eye image to the mobile terminal;
  (d) detecting a target approaching the vehicle, wherein the program instructions further comprise:
    based on a change request from the mobile terminal, changing the first virtual viewpoint to a second virtual viewpoint and generating a second bird's-eye image viewed from the second virtual viewpoint after changing from the first virtual viewpoint to the second virtual viewpoint, and
    when a signal indicating that an automatic follow-up is selected is received from the mobile terminal, initiating an automatic follow-up that is free from user input, the automatic follow-up causing the image-capturing part to point at the target approaching the vehicle, and
  (e) sending the first bird's-eye image from the first virtual viewpoint and sending the second bird's eye-image from the second virtual viewpoint based on the received change request and then sending a video when the signal indicating that the automatic follow-up is selected is received from the mobile terminal.

14. The recording medium of claim 13, the program instructions further comprise the step of detecting a target in the periphery of the vehicle, wherein the generation step includes starting generation of the first bird's-eye image when the target has been detected in the periphery of the vehicle.

15. The recording medium of claim 13, wherein the wireless transmission step includes transmitting the captured image of the periphery of the vehicle based on a transmit request received from the mobile terminal.

16. The recording medium of claim 13, the program instructions further comprises the step of capturing another image including a part of a vehicle cabin of the vehicle and a part of the periphery of the vehicle, wherein the wireless transmission step includes transmitting the captured another image including the part of the vehicle cabin to the mobile terminal based on a transmit request received from the terminal.

17. The recording medium of claim 13, wherein the generation of the first bird's-eye image includes generating the first bird's-eye image when a target in the periphery of the vehicle is approaching the vehicle.

18. The recording medium of claim 13, wherein the mobile terminal is a terminal that is carried by a user of the vehicle and is located externally of the vehicle.

* * * * *